(12) United States Patent
Ebbini et al.

(10) Patent No.: US 12,502,160 B2
(45) Date of Patent: Dec. 23, 2025

(54) ULTRASOUND IMAGING SYSTEM AND METHOD

(71) Applicant: REGENTS OF THE UNIVERSITY OF MINNESOTA, Minneapolis, MN (US)

(72) Inventors: Emad S. Ebbini, Edina, MN (US); Nayef Abdulrahman Alshamlan, Minneapolis, MN (US); Abhishek Sahoo, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 0 days.

(21) Appl. No.: 18/689,179

(22) PCT Filed: Sep. 9, 2022

(86) PCT No.: PCT/US2022/042999
§ 371 (c)(1),
(2) Date: Mar. 5, 2024

(87) PCT Pub. No.: WO2023/039130
PCT Pub. Date: Mar. 16, 2023

(65) Prior Publication Data
US 2024/0407764 A1    Dec. 12, 2024

Related U.S. Application Data

(60) Provisional application No. 63/242,904, filed on Sep. 10, 2021.

(51) Int. Cl.
*A61B 8/00*  (2006.01)
*A61B 8/08*  (2006.01)
*G06T 7/00*  (2017.01)

(52) U.S. Cl.
CPC .............. *A61B 8/5223* (2013.01); *A61B 8/08* (2013.01); *G06T 7/0012* (2013.01); *G06T 2207/10132* (2013.01); *G06T 2207/30004* (2013.01)

(58) Field of Classification Search
CPC ......... A61B 8/5223; A61B 8/08; A61B 8/085; G06T 7/0012; G06T 2207/10132; G06T 2207/30004; G01S 7/52038
See application file for complete search history.

(56) References Cited

U.S. PATENT DOCUMENTS 6,951,540 B2     10/2005   Ebbini et al.
2002/0133094 A1*  9/2002   Wilcox ................ A61B 5/4824
                                                 600/587

(Continued)

FOREIGN PATENT DOCUMENTS

WO    WO 2023/039130 A2    3/2023
WO    WO 2023/039130 A3    3/2023

OTHER PUBLICATIONS

Meenavathi et al. "Volterra Filtering Techniques for Removal of Gaussian and Mixed gaussian-Impulse Noise". 2007. International Journal of Electrical and Computer Engineering, vol. 1, No. 2, 184-190. (Year: 2007).*

(Continued)

*Primary Examiner* — Keith M Raymond
*Assistant Examiner* — Andrew W Begeman
(74) *Attorney, Agent, or Firm* — Mueting Raasch Group

(57) ABSTRACT

Embodiments are directed to a method for use in ultrasound imaging of matter in a region comprising providing wave energy into the region and transducing wave energy returned from the region to form a set of receive signals defining received signal data. The method comprises separating linear and nonlinear components of the received signal data based on a second order Volterra model. The method also (Continued)

comprises computing an estimate of a tissue acoustic nonlinearity parameter, B/A, using a ratio of the nonlinear component to the linear component, and identifying tissue characteristics of the matter in the region using the B/A.

16 Claims, 24 Drawing Sheets

(56) References Cited

U.S. PATENT DOCUMENTS

| | | |
|---|---|---|
| 2004/0030251 A1* | 2/2004 | Ebbini ................ G01S 7/52039 600/443 |
| 2009/0287082 A1 | 11/2009 | Lizzi et al. |
| 2014/0088421 A1 | 3/2014 | Guzina et al. |
| 2019/0308036 A1 | 10/2019 | Ebbini |
| 2021/0077074 A1 | 3/2021 | McLaughlin et al. |

OTHER PUBLICATIONS

Panfilova et al. "A review of B/A measurement methods with a clinical perspective", Apr. 2, 2021. The Journal of the Acoustical Society of America. 149, 2200-2237 (Year: 2021).*

Patent Application No. PCT/US2022/042999, filed Sep. 9, 2022; International Search Report/Written issued Feb. 23, 2023; 16 pages.

Patent Application No. PCT/US2022/042999, filed Sep. 9, 2022; International Preliminary Report on Patentability issued Mar. 5, 2024; 8 pages.

Du et al., "Nonlinear Imaging of Microbubble Contrast Agent Using the Voltera Filter: In Vivo Results" IEEE Transactions on Ultrasonics, Ferroelectrics, and Frequency Control, vol. 63, No. 12, Dec. 2016, 2069-81.

* cited by examiner

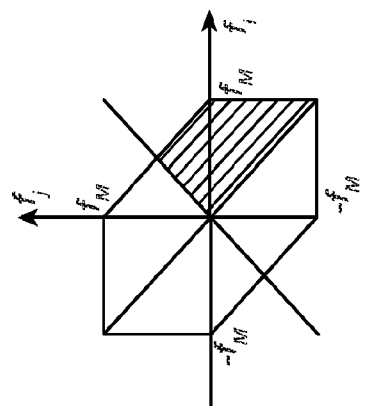
FIG. 3C
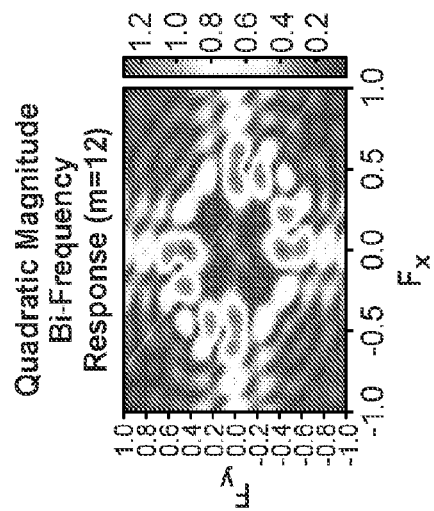
FIG. 4C
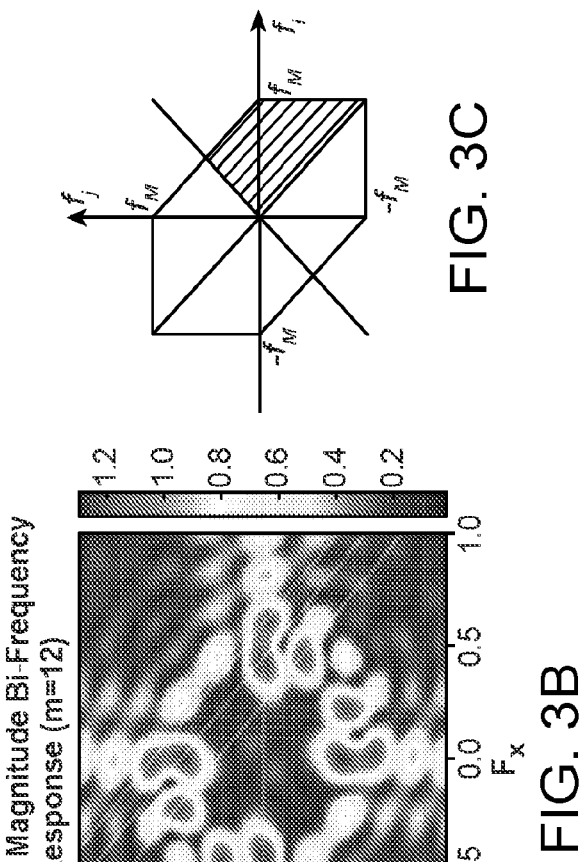
FIG. 3B
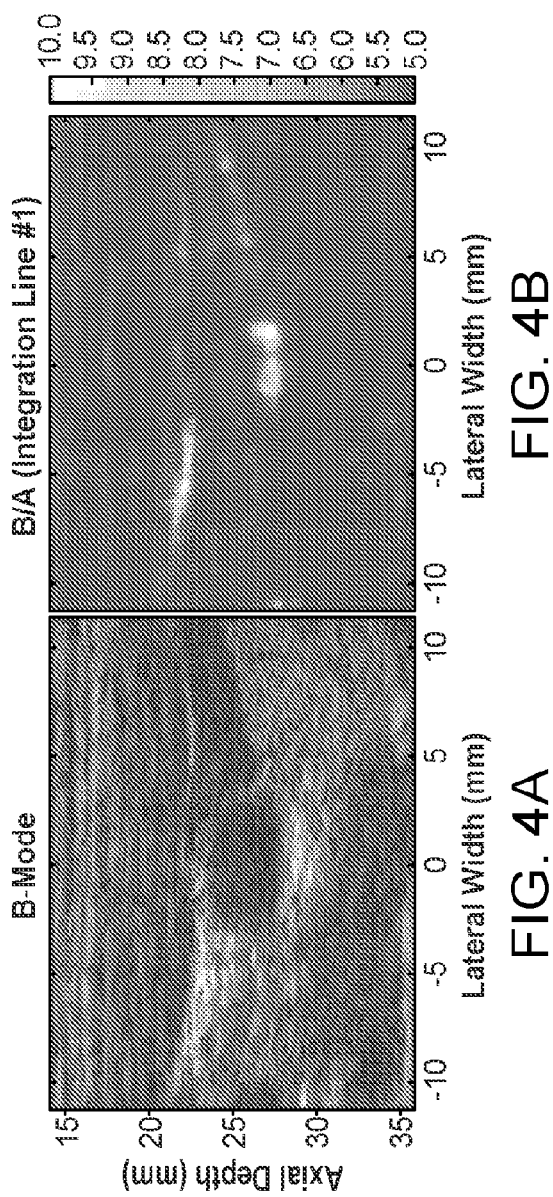
FIG. 4B
FIG. 4A
FIG. 3A Table I QA PHANTOM DATA SET: GROUPING OF SINGULAR MODES BASED ON THE KERNELS' BIFREQUENCY RESPONSES

|  | Singular Modes | Frequency (in MHz) | | |
|---|---|---|---|---|
|  |  | Interacting | | Observed |
|  |  | $f1$ | $f2$ |  |
| Band 1 | 5,6,7,8 | 4.8 | 4.8 | 8.4 |
| Band 2 | 9,10,11,12 | 7.8 | 3.3 | 11.1 |
| Band 3 | 17,18,19,21 | 7.3 | 7.3 | 14.6 |
| Band 4 | 22,23,24 | 8.3 | 8.3 | 16.6 |

FIG. 11

Table II

QA PHANTOM DATASET: CONTRAST TO TISSUE RATIO (IN DB) OF
DIFFERENT IMAGING DATA COMPUTED AT LOCAL CONTRAST REGIONS

| in dB | Contrast Target | Cystic Target (4 mm) | Cystic Target (2 mm) |
|---|---|---|---|
| B-mode | 6.1884 | -11.2064 | -13.5727 |
| QB 1 | 12.4705 | -22.2407 | -12.7917 |
| QB 2 | 10.3725 | -24.6727 | -12.6215 |
| QB 3 | 10.6600 | -29.0504 | -29.9629 |
| QB 4 | 9.0277 | -23.2089 | -34.2765 |

FIG. 13

Table III
QA PHANTOM DATASET: SPATIAL EXTENT MEASUREMENT OF WIRE TARGETS FOR DIFFERENT IMAGING DATASET

| | Lateral (in mm) | | | | | | Axial (in mm) | | | | | |
|---|---|---|---|---|---|---|---|---|---|---|---|---|
| | Wire 1 | Wire 2 | Wire 3 | Wire 4 | Wire 5 | Average | Wire 1 | Wire 2 | Wire 3 | Wire 4 | Wire 5 | Average |
| B-mode | 1.96 | 1.84 | 1.96 | 2.35 | 1.8 | 1.982 | 0.87 | 0.7 | 0.86 | 0.93 | 0.82 | 0.836 |
| QB 1 | 1.94 | 1.73 | 1.87 | 2.26 | 1.79 | 1.918 | 0.88 | 0.83 | 1.01 | 0.91 | 0.94 | 0.914 |
| QB 2 | 1.79 | 1.52 | 1.42 | 1.82 | 1.4 | 1.59 | 0.91 | 0.94 | 0.97 | 1.09 | 0.96 | 0.974 |
| QB 3 | 0.98 | 1.08 | 1.21 | 1.45 | 0.92 | 1.128 | 0.58 | 0.59 | 0.8 | 0.54 | 0.55 | 0.612 |
| QB 4 | 0.93 | 1.09 | 1.17 | 1.47 | 0.88 | 1.108 | 0.57 | 0.65 | 0.8 | 0.55 | 0.56 | 0.626 |

Table IV

QA PHANTOM DATASET: IMAGE SPATIAL RESOLUTION

| Resolution (in mm) | B-mode | QB 1 | QB 2 | QB 3 | QB 4 |
|---|---|---|---|---|---|
| Lateral | 2.7573 | 2.1469 | 2.0423 | 1.531 | 1.2448 |
| Axial | 1.0142 | 0.77544 | 0.86808 | 0.7391 | 0.60084 |

FIG. 16

Table V

*In-vivo* DATASET: GROUPING OF SINGULAR MODES BASED ON THE KERNELS' BIFREQUENCY RESPONSES WITH AND WITHOUT UCA

| | Singular Modes | Frequency(in MHz) | | |
| --- | --- | --- | --- | --- |
| | | Interacting | | Observed |
| | | $f1$ | $f2$ | |
| Without UCA | | | | |
| Band 1 | 3,4,6,8,9,10 | 3.6 | 3.6 | 7.2 |
| Band 2 | 11,13,14,15,17 | 5.8 | 5.8 | 11.6 |
| Band 3 | 18,19,20,21,22,23 | 7 | 7 | 14 |
| With UCA | | | | |
| Band 1 | 5,8,9 | 3.3 | 3.3 | 6.6 |
| Band 2 | 10,12,13,14 | 5.8 | 5.8 | 11.6 |
| Band 3 | 15,17,18,19,20,21 | 6.7 | 6.7 | 13.4 |

FIG. 18

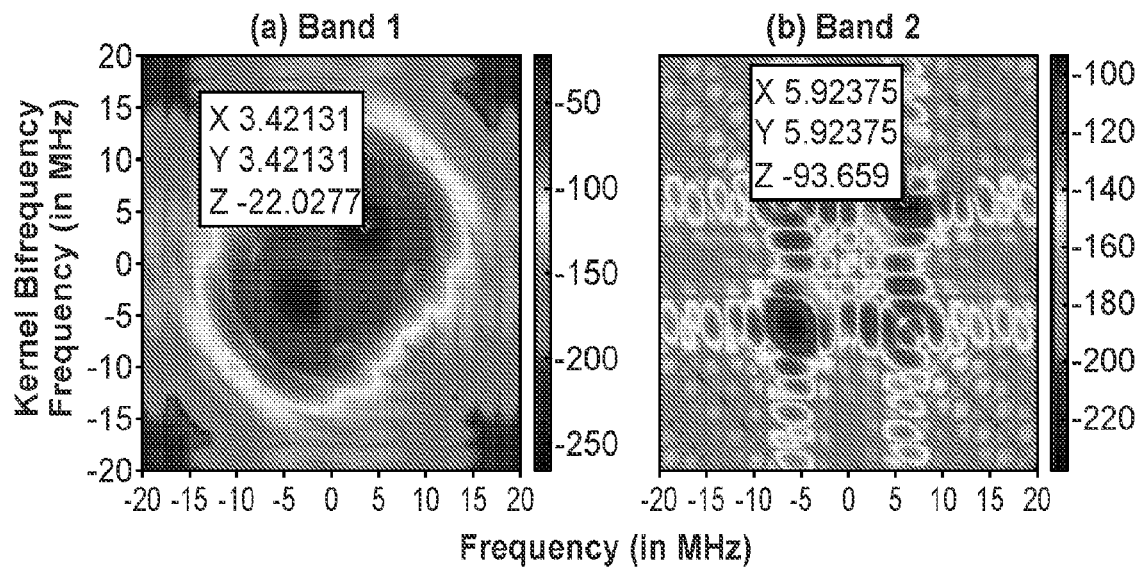
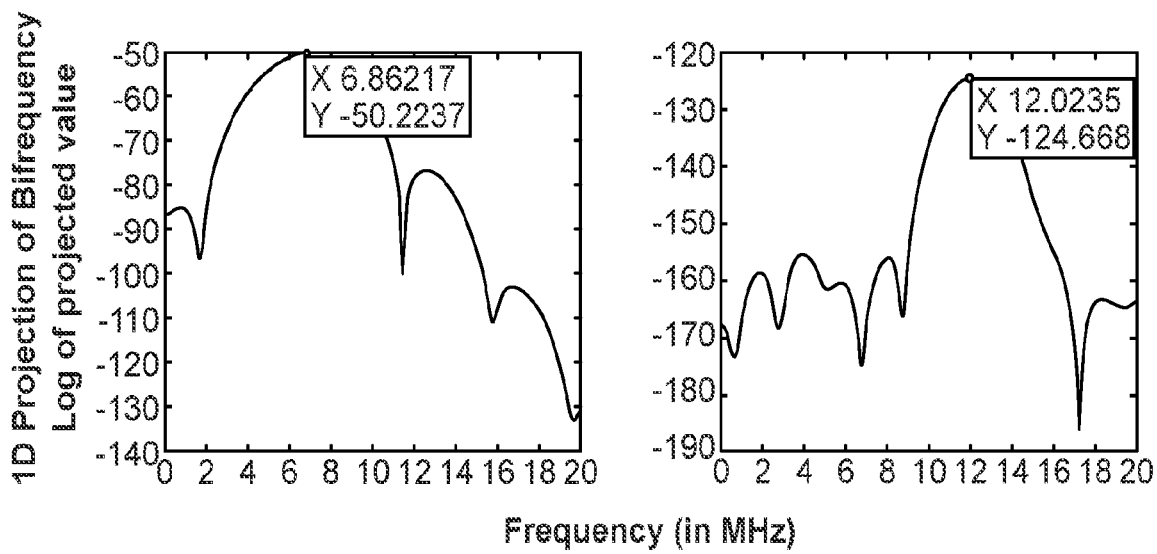
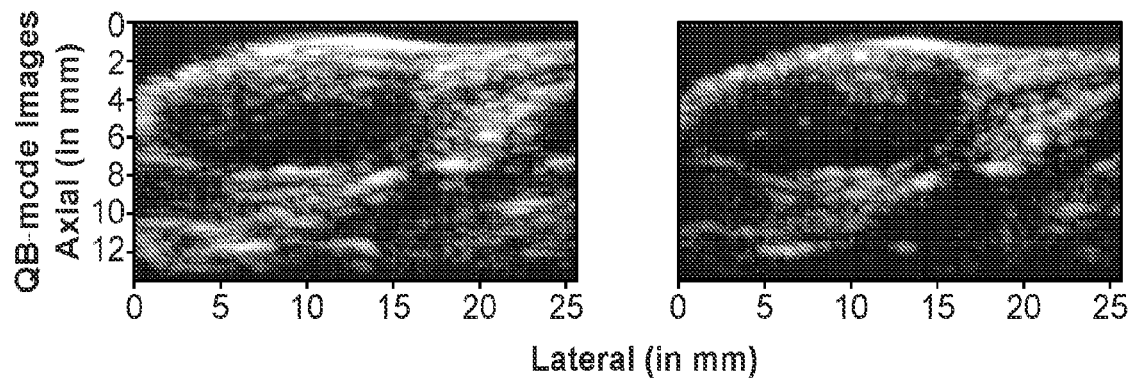
FIG. 19A     FIG. 19B

Table VII

*In-vivo* DATASET: IMAGE SPATIAL RESOLUTION USING AUTO-COVARIANCE ANALYSIS

| (Resolution) (in mm) | B-mode | QB 1 | QB 2 | QB 3 |
|---|---|---|---|---|
| Without UCA | | | | |
| Lateral | 0.9942 | 0.7978 | 0.6400 | 0.5945 |
| Axial | 0.3630 | 0.2988 | 0.3906 | 0.3858 |
| With UCA | | | | |
| Lateral | 1.1040 | 0.8263 | 0.6643 | 0.6030 |
| Axial | 0.4102 | 0.3201 | 0.3088 | 0.3342 |

FIG. 23

ULTRASOUND IMAGING SYSTEM AND METHOD

CROSS-REFERENCE TO RELATED APPLICATIONS

This application is the § 371 U.S. National Stage of International Application No. PCT/US2022/042999, filed Sep. 9, 2022, which claims the benefit of U.S. Provisional Application No. 63/242,904 filed Sep. 10, 2021, the disclosures of which are incorporated herein by reference in their entireties.

TECHNICAL FIELD

The present disclosure relates to ultrasound imaging systems and methods. In particular, the present disclosure relates to ultrasound imaging systems and devices for sensing, imaging, and therapy.

SUMMARY

Some embodiments are directed to a method for use in ultrasound imaging of matter in a region of interest. The method comprises transmitting wave energy into the region of interest, and transducing wave energy returned from the region of interest to form a set of receive signals defining received signal data. The method comprises separating linear and nonlinear components of the received signal data based on a second order Volterra model. The method also comprises computing an estimate of a tissue acoustic nonlinearity parameter, B/A, using a ratio of the nonlinear component to the linear component. The method further comprises identifying tissue characteristics of the matter in the region of interest using the B/A parameter.

Some embodiments are directed to a method for use in ultrasound imaging of matter in a region of interest. The method comprises transmitting wave energy into the region of interest, and transducing wave energy returned from the region of interest to form a set of receive signals defining received signal data. The method comprises separating linear and nonlinear components of the received signal data based on a second order Volterra model. Separating the linear and nonlinear components of the received signal data based on the second order Volterra model comprises synthesizing a plurality of quadratic filter kernels using individual singular modes, isolating specified bifrequency peaks in the bifrequency response of individual quadratic filter kernels using 2D Gaussian filters centered at the specified peaks, grouping together quadratic filter kernels having bifrequency peaks in the same vicinity, and summing the quadratic filter kernels after adjusting for a time delay observed in the RF domain.

Some embodiments are directed to ultrasound transducer device comprising transmit circuitry coupled to an array of ultrasound transducers and configured to transmit wave energy into a region of interest, and receive circuitry coupled to the array of ultrasound transducers and configured to transduce wave energy returned from the region of interest to form a set of receive signals defining received signal data. A second order Volterra filter is configured to separate linear and nonlinear components of the received signal data based on a second order Volterra model. A processor is configured to compute an estimate of a tissue acoustic nonlinearity parameter, B/A, using a ratio of the nonlinear component to the linear component, and identify tissue characteristics of the matter in the region of interest using the B/A parameter.

Some embodiments are directed to ultrasound transducer device comprising transmit circuitry coupled to an array of ultrasound transducers and configured to transmit wave energy into a region of interest, and receive circuitry coupled to the array of ultrasound transducers and configured to transduce wave energy returned from the region of interest to form a set of receive signals defining received signal data. A second order Volterra filter is configured to separate linear and nonlinear components of the received signal data based on a second order Volterra model. A processor is configured to synthesize a plurality of quadratic filter kernels using individual singular modes, isolate specified bifrequency peaks in the bifrequency response of individual quadratic filter kernels using 2D Gaussian filters centered at the specified peaks, group together quadratic filter kernels having bifrequency peaks in the same vicinity, and sum the quadratic filter kernels after adjusting for a time delay observed in the RF domain.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIGS. 3A-3C show frequency interactions which include observed spectra (FIG. 3A), the underlying bifrequency response of the quadratic kernel of a second order Volterra Filter (FIG. 3B), and a schematic representation between the bifrequency quadratic signal distribution (FIG. 3C) in accordance with any of the embodiments disclosed herein;

FIGS. 4A-4C illustrates an in vivo imaging result of a plaque using a diagnostic ultrasound system in accordance with any of the embodiments disclosed herein, wherein FIG. 4A shows a B-mode image of the femoral artery of a familial hypercholesterolemic swine with a plaque at the distal wall of the target vessel, which is very prominent on the B/A image of FIG. 4B;

FIGS. 7A-7C illustrate an example quality assurance phantom dataset wherein FIG. 7A is a B-mode image of original phantom data, FIG. 7B is a spectrogram of the image of FIG. 7A computed for a particular A-line, and FIG. 7C shows a covariance cell size analysis performed over a small rectangular region of the FIG. 7A image;

FIGS. 10A and 10B illustrate an example quality assurance phantom dataset in the form of an RF A-line analysis of individual images reconstructed using kernels synthesized from singular modes 5,6,7, and 8, wherein FIG. 10A shows RF A-lines of unaligned kernels and their simple sum, and FIG. 10B shows RF A-lines of aligned kernels and their coherent sum;

FIG. 11 shows Table I in which singular modes are divided into four groups based on quadratic activities of the corresponding kernels;

FIG. 13 illustrates an example quality assurance phantom dataset in the form of a table (Table II) showing contrast to tissue ratio (CTR) of different imaging data computed at local contrast regions based on the B-mode image shown in FIG. 7(A);

FIG. 16 illustrates an example quality assurance phantom dataset in the form of image spatial resolution in which resolution cell sizes are computed following equation (19);

FIG. 18 illustrates an in-vivo dataset (Table V) which captures and groups the singular modes used to synthesize quadratic kernels at different energy bands, the grouping of singular modes based on the kernels' bifrequency responses with and without UCA;

FIGS. 19A-19C illustrate an in-vivo dataset before UCA injection for the three different nonlinear energy interaction bands (Bands 1, 2, 3) as defined in Table V of FIG. 18, wherein the rows display the bifrequency response of the quadratic kernels, their one dimensional projection computed along the frequency summation line, and QB-mode images respectively;

FIG. 23 illustrates an in-vivo dataset of image spatial resolution using an auto-covariance analysis, wherein the spatial resolution values were calculated following equation (19) and tabulated in Table VII before and after UCA injection.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
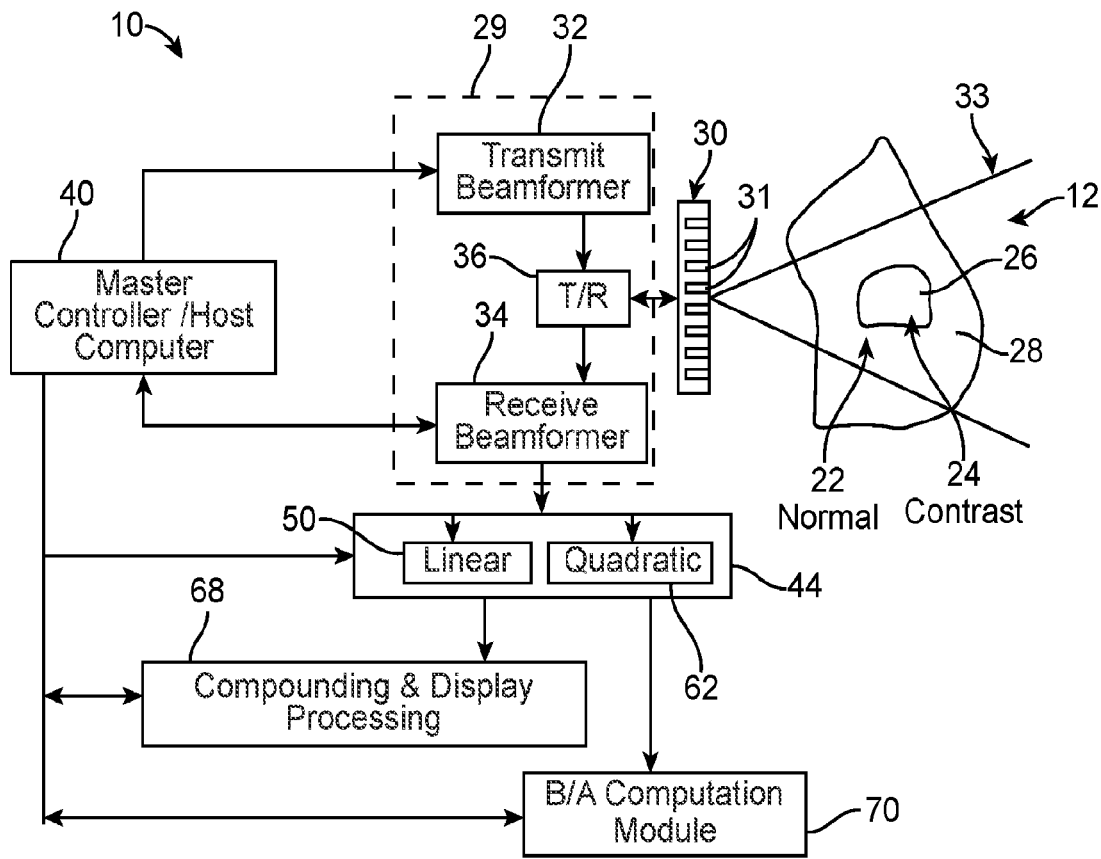
FIGS. 1A and 1B are a block diagrams illustrating an example embodiment of an ultrasound imaging system in accordance with any of the embodiments disclosed herein.

Ultrasound imaging is a widely used medical imaging modality with a wide range of vascular, cardiac and musculoskeletal applications, to name a few. Since its introduction in the late 1990's, tissue harmonic distortion imaging (THDI) has gained popularity in abdominal imaging due to improved contrast at the expense of some deterioration of axial resolution.

The use of ultrasound imaging for the structural characterization of tissue composition is now well accepted and widely used. Reliable measurements of subcutaneous fat thickness can be routinely made using widely available linear array probes designed for musculoskeletal imaging applications. Texture analysis produces excellent segmentation of different layers within the region of interest (ROI), which enables accurate structural measurements. However, it is believed that, presently, no quantitative measurements are made to characterize the muscle fascia or the muscle tissues.

One major application of great interest is the myofascial pain syndrome (MPS). Myofascial pain, pain originating from muscles and/or associated soft tissues such as fascia, is likely an important component of many severe and chronic pain conditions, including chronic low back pain, temporomandibular disorders, chronic neck and shoulder pain, as well as headache. However, knowledge regarding the contribution of myofascial tissues especially fascia and the interactions between fascia, muscles, and peripheral nerves-to many pain types remains mostly scant. Consequently, evidence on which treatments are effective for myofascial pain is limited, and clinicians currently lack objective guidance on how to treat pain conditions with myofascial origin.

Thus, identifying and developing quantitative and innovative biomarkers for myofascial tissues are important for effective pain management regimes through a variety of therapeutic approaches, including nonpharmacologic therapies. In addition, such biomarkers may also shed light on the transition from acute to chronic pain. The quantitative imaging methods and systems disclosed herein, especially if implemented as part of a wearable device, can play an important role in the observation and assessment of tissue properties associated with pain sensation in real time.

Combining the quantitative imaging capabilities of the proposed device with the therapeutic capabilities of a dual-mode ultrasound transducer (DMUT) concept can also provide treatment options at or near the myofascial trigger points (MTrPs) and its surrounds. In fact, a whole range of thermal and nonthermal tissue excitations can be used for target characterization as well as potential treatment to relieve the pain or resolve the MTrPs. Some embodiments are directed to a DMUT (e.g., a wearable patch DMUT) configured for quantitative imaging in accordance with the present disclosure, and may be implemented in a manner disclosed in commonly-owned U.S. Patent Publication No. 2019/0308036, which is incorporated herein by reference in its entirety.

Embodiments of the disclosure are directed to a quantitative imaging method and system for the identification of tissue with high fat infiltration using pulse-echo ultrasound. The method is based on the use of echo data from regions of interest (e.g. atherosclerotic plaque, myofascia trigger point and its surrounds, liver, kidney, spleen, etc.) to design linear and nonlinear filters for separating the linear and quadratic echo components. A ratio of the quadratic to linear energy components of the echo is formed to provide a quantitative estimate of the tissue acoustic nonlinearity parameter, known in the literature as the B/A. The quantitative estimate of the B/A can be used by a processor or computer of an imaging system to identify tissue characteristics, such as tissue with high fat infiltration.

An important aspect is a data-driven method for synthesizing the linear and quadratic filters based on specific frequency interactions in the bispectrum underlying the observed quadratic signal spectrum. This is combined with an analytical method for estimating the B/A of the tissue within the region of interest, which provides information about the fat content and other tissue characteristics with diagnostic and therapeutic applications. Combined with wearable ultrasound technology according to some embodiments, the present imaging methodology can be applied in home care settings, sports medicine and similar applications.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. A method for use in ultrasound imaging of matter in a region of interest comprises transmitting wave energy into the region of interest, transducing wave energy returned from the region of interest to form a set of receive signals defining received signal data, separating linear and nonlinear components of the received signal data based on a second order Volterra model, computing an estimate of a tissue acoustic nonlinearity parameter, B/A, using a ratio of the nonlinear component to the linear component, and identifying tissue characteristics of the matter in the region of interest using the B/A parameter.

Example Ex2. The method according to Ex1, wherein identifying the tissue characteristics of the matter in the region of interest comprises identifying tissue with high fat infiltration.

Example Ex3. The method according to Ex1 or Ex2, comprising comparing the computed B/A parameter to B/A values established for different tissue characteristics.

Example Ex4. The method according to one or more of Ex1 to Ex3, comprising separating linear and nonlinear components of the received signal data based on a third order Volterra model, computing the estimate of the tissue acoustic nonlinearity parameter, B/A, using a ratio of a quadratic component to the linear component, computing an estimate of a tissue acoustic nonlinearity parameter, C/A, using a ratio of a cubic component to the linear component, and identifying tissue characteristics of the matter in the region of interest using the B/A and C/A parameters.

Example Ex5. The method according to one or more of Ex1 to Ex4, wherein the transmitted wave energy is synthesized with specific spectral components configured to create specific frequency interactions in the region of interest.

Example Ex6. The method according to one or more of Ex1 to Ex5, wherein the region of interest is a myofascial pain syndrome (MPS) trigger point and its surrounds.

Example Ex7. A method for use in ultrasound imaging of matter in a region of interest comprises transmitting wave energy into the region of interest, transducing wave energy returned from the region of interest to form a set of receive signals defining received signal data, and separating linear and nonlinear components of the received signal data based on a second order Volterra model. Separating the linear and nonlinear components of the received signal data based on the second order Volterra model comprises synthesizing a plurality of quadratic filter kernels using individual singular modes, isolating specified bifrequency peaks in the bifrequency response of individual quadratic filter kernels using 2D Gaussian filters centered at the specified peaks, grouping together quadratic filter kernels having bifrequency peaks in the same vicinity, and summing the quadratic filter kernels after adjusting for a time delay observed in the RF domain.

Example Ex8. The method according to Ex7, comprising segregating the quadratic filter kernels into multiple groups based on nonlinear frequency interaction captured by the quadratic filter kernels after evaluating a bifrequency response of the quadratic filter kernels.

Example Ex9. The method according to Ex7 or Ex8, further comprising computing an estimate of a tissue acoustic nonlinearity parameter, B/A, using a ratio of the nonlinear component to the linear component, and identifying tissue characteristics of the matter in the region of interest using the B/A parameter.

Example Ex10. The method according to Ex9, wherein identifying the tissue characteristics of the matter in the region of interest comprises identifying tissue with high fat infiltration.

Example Ex11. The method according to Ex9 or Ex10, comprising comparing the computed B/A parameter to B/A values established for different tissue characteristics.

Example Ex12. The method according to one or more of Ex7 to Ex11, comprising separating linear and nonlinear components of the received signal data based on a third order Volterra model, computing an estimate of a tissue acoustic nonlinearity parameter, B/A, using a ratio of a quadratic component to the linear component, computing an estimate of a tissue acoustic nonlinearity parameter, C/A, using a ratio of a cubic component to the linear component, and identifying tissue characteristics of the matter in the region of interest using the B/A and C/A parameters.

Example Ex13. The method according to one or more of Ex7 to Ex12, wherein the transmitted wave energy is synthesized with specific spectral components configured to create specific frequency interactions in the region of interest.

Example Ex14. The method according to one or more of Ex7 to Ex13, wherein the region of interest is a myofascial pain syndrome (MPS) trigger point and its surrounds.

Example Ex15. An ultrasound transducer device comprises transmit circuitry coupled to an array of ultrasound transducers and configured to transmit wave energy into a region of interest, receive circuitry coupled to the array of ultrasound transducers and configured to transduce wave energy returned from the region of interest to form a set of receive signals defining received signal data, a second order Volterra filter configured to separate linear and nonlinear components of the received signal data based on a second order Volterra model, and a processor configured to compute an estimate of a tissue acoustic nonlinearity parameter, B/A, using a ratio of the nonlinear component to the linear component and identify tissue characteristics of the matter in the region of interest using the B/A parameter.

Example Ex16. The device according to Ex15, wherein the processor is configured to identify tissue with high fat infiltration.

Example Ex17. The device according to Ex15 or Ex16, wherein the processor is configured to compare the computed B/A parameter to B/A values established for different tissue characteristics.

Example Ex18. The device according to one or more of Ex15 to Ex17, comprising a third order Volterra filter configure to separate linear and nonlinear components of the received signal data based on a third order Volterra model, wherein the processor is configured to compute the estimate of the tissue acoustic nonlinearity parameter, B/A, using a ratio of a quadratic component to the linear component, compute an estimate of a tissue acoustic nonlinearity parameter, C/A, using a ratio of a cubic component to the linear component, and identify tissue characteristics of the matter in the region of interest using the B/A and C/A parameters.

Example Ex19. The device according to one or more of Ex15 to Ex18, wherein the transmitted wave energy is synthesized by the transmit circuitry with specific spectral components configured to create specific frequency interactions in the region of interest.

Example Ex20. The device according to one or more of Ex15 to Ex19, wherein the region of interest is a myofascial pain syndrome (MPS) trigger point and its surrounds.

Example Ex21. An ultrasound transducer device comprises transmit circuitry coupled to an array of ultrasound transducers and configured to transmit wave energy into a region of interest, receive circuitry coupled to the array of ultrasound transducers and configured to transduce wave energy returned from the region of interest to form a set of receive signals defining received signal data, and a second order Volterra filter configured to separate linear and nonlinear components of the received signal data based on a second order Volterra model. A processor is configured to synthesize a plurality of quadratic filter kernels using individual singular modes, isolate specified bifrequency peaks in the bifrequency response of individual quadratic filter kernels using 2D Gaussian filters centered at the specified peaks, group together quadratic filter kernels having bifrequency peaks in the same vicinity, and sum the quadratic filter kernels after adjusting for a time delay observed in the RF domain.

Example Ex22. The device according to Ex21, wherein the processor is configured to segregate the quadratic filter kernels into multiple groups based on nonlinear frequency interaction captured by the quadratic filter kernels after evaluating a bifrequency response of the quadratic filter kernels.

Example Ex23. The device according to Ex21 or Ex22, wherein the processor is configured to compute an estimate of a tissue acoustic nonlinearity parameter, B/A, using a ratio of the nonlinear component to the linear component, and identify tissue characteristics of the matter in the region of interest using the B/A parameter.

Example Ex24. The device according to one or more of Ex21 to Ex23, wherein the processor is configured to identify tissue with high fat infiltration.

Example Ex25. The device according to one or more of Ex21 to Ex24, wherein the processor is configured to compare the computed B/A parameter to B/A values established for different tissue characteristics.

Example Ex26. The device according to one or more of Ex21 to Ex25, wherein the processor is configured to separate linear and nonlinear components of the received signal data based on a third order Volterra model, compute an estimate of a tissue acoustic nonlinearity parameter, B/A, using a ratio of a quadratic component to the linear component, compute an estimate of a tissue acoustic nonlinearity parameter, C/A, using a ratio of a cubic component to the linear component, and identify tissue characteristics of the matter in the region of interest using the B/A and C/A parameters.

Example Ex27. The device according to one or more of Ex21 to Ex26, wherein the transmitted wave energy is synthesized with specific spectral components configured to create specific frequency interactions in the region of interest.

Example Ex28. The device according to one or more of Ex21 to Ex27, wherein the region of interest is a myofascial pain syndrome (MPS) trigger point and its surrounds.

FIG. 1A shows an illustrative ultrasound imaging system 10 according to embodiments of the disclosure. The ultrasound imaging system 10 provides for an improvement in medical ultrasound imaging through the use of a band selective quadratic Volterra kernel synthesis methodology which provides for generation of high quality nonlinear images and produces enhanced B/A computations. These and other improvement are realized through use of a second order Volterra filter (SoVF) 44, represented generally by linear and nonlinear kernels 50, 62 of SoVF 44. The SoVF 44 is capable of separating the linear and nonlinear components of image data returned from a region 12 being imaged by the ultrasound imaging system 10 in a manner discussed in detail hereinbelow.

Figure 1B:
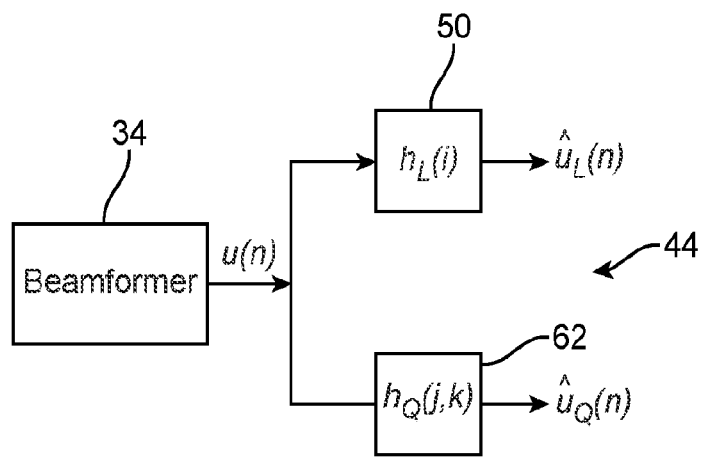
Figure 2:
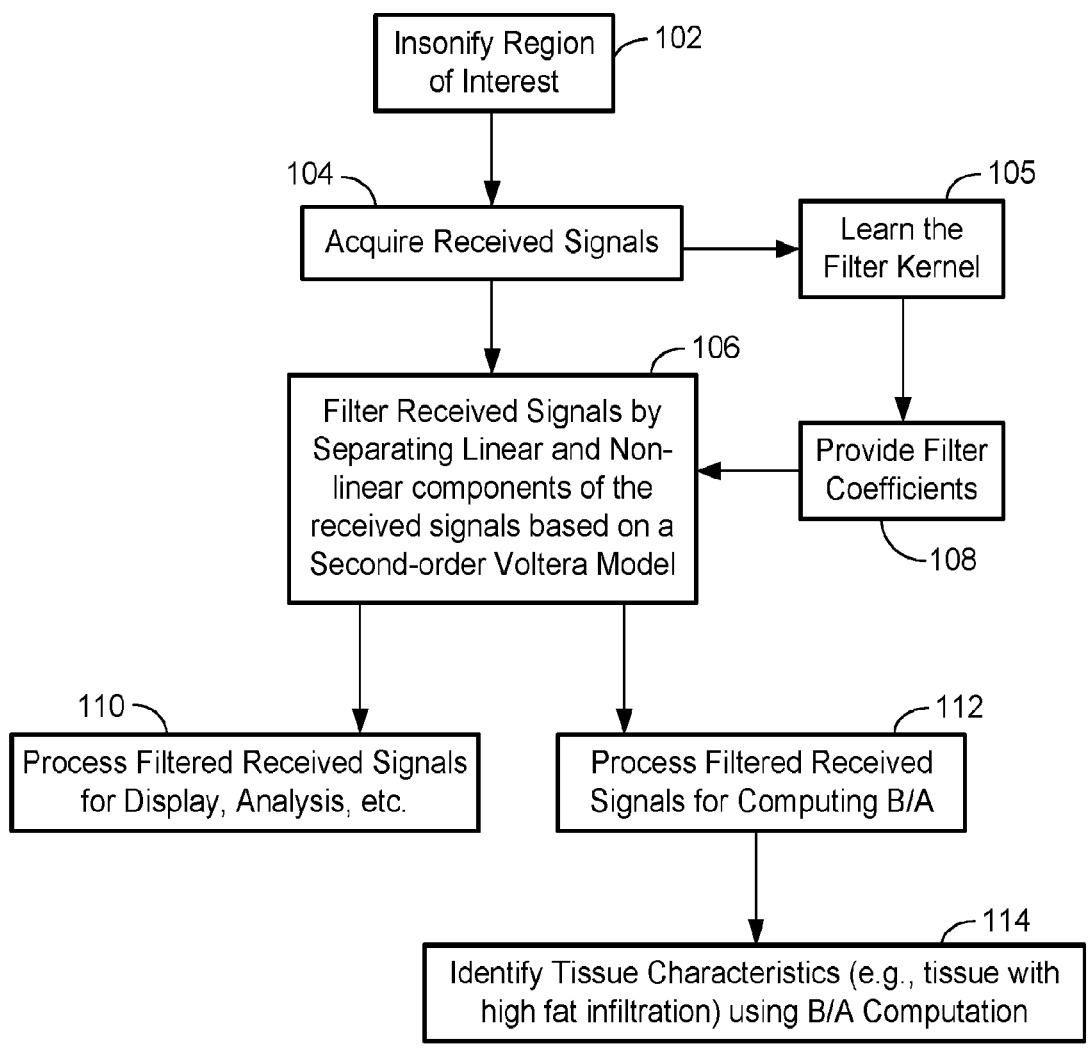
FIG. 2 is a method implemented by the ultrasound imaging system illustrated in FIGS. 1A and 1B in accordance with any of the embodiments disclosed herein.

As shown in FIG. 1A, the ultrasonic imaging system 10, which is operable to implement the method of FIG. 2, includes transducer 30 along with transmit and receive (T/R) circuitry 29 for driving the transducer 30. The transmit and receive (T/R) circuitry 29 includes transmit beamformer 32, receive beamformer 34 (see details shown in FIG. 1B), along with other circuitry such as signal conditioning circuitry conventionally used for controlling transmission of ultrasound pulses and generating signals in response to returned echo. The transducer 30 is preferably a transducer array that includes a plurality of separately driven transducer elements 31, each of which produces a burst of acoustic energy when energized by a pulse waveform provided by T/R circuitry 29.

In operation, with reference to one illustrative medical application of imaging a region 12 having fatty tissue therein, wave energy is provided from the transducer elements 31 into the region 12 that includes normal region 22 and contrast region 24. For example, the normal region 22 may include normal tissue 28, whereas the contrast region 24 may include tissue with high fat infiltration in region 26.

In other words, for example, the region 12 from which the reflected energy is received can be referred to as an image region and may include blood, tissue, and a nonlinear contrast agent.

The transmitted wave energy can be synthesized by the T/R circuitry 29 with specific spectral components designed to create specific frequency interactions in one or more regions of interest (ROI). An example waveform that has specific frequency components is mixing 1.5 MHz with 4 MHz to obtain sum and difference frequencies at 5.5 MHz and 2.5 MHz. Similarly, 5 and 2 MHz transmitted components generate 7 and 3 MHz sum and difference frequencies, respectively. In both cases, the waveform design is such that the difference frequency falls within the transducer bandwidth and, therefore, can be easily detected in the intended ROI with high sensitivity and specificity.

The wave energy reflected back to the transducer elements 31 from the region 12 being imaged (e.g., echo) is converted to an electrical signal by each receiving transducer element 31 and applied separately to receiver components of the T/R circuitry 29 through a set of T/R switches 36 of the T/R circuitry 29. The T/R switches 36 may include diodes which protect the receive electronics from high voltages generated by the transmit electronics.

T/R circuitry 29 is operated under control of master controller/host computer 40 (also referred to herein as computer 40 or processor 40), which can be responsive to commands by a human operator. For example, a user interface is generally provided for input of one or more various parameters, selection choices, etc. A complete scan may be performed by acquiring a series of echoes in which the transmitter electronics of the T/R circuitry 29 is gated on momentarily to energize each transducer element 31 and the subsequent echo signals produced by each transducer element 31 are applied to receiver electronics of T/R circuitry 29. A channel corresponding to each transducer may begin reception while another channel is still transmitting. Receiver circuitry of T/R circuitry 29 combines the separate echo signals from each transducer element to produce a single echo signal which is used to produce a lock in an image, e.g., an image to be displayed on a display monitor (not shown).

Under the direction of the master controller/host computer 40, transmitter circuitry of T/R circuitry 29 drives transducer 30 such that the ultrasonic energy is transmitted as a directed focused beam 33. To accomplish this, respective time delays are imported to a plurality of pulsers by a transmit beamformer 32 of T/R circuitry 29. Master controller/host computer 40 determines the conditions under which the acoustic pulses will be transmitted. With this information, transmit beamformer 32 determines the timing and amplitudes of each of the transmit pulses. By appropriately adjusting the transmit focus time delays in a conventional manner and other parameters, an ultrasonic beam can be directed and focused to form a transmit beam 33.

The echo signals produced by each burst (i.e., pulse) of ultrasonic energy reflect from matter located at successive ranges along each transmit beam. The echo signals are sensed separately by each transducer element 31 and a sample of the magnitude of the echo signal at a particular point in time represents the amount of reflection occurring at a specific range. Due to differences in the propagation paths between a reflecting point and each transducer element 30, the echo signals will not be detected simultaneously and their amplitudes will not be equal. Receiver circuitry of T/R circuitry 29 amplifies the separate echo signals which are fed to a receive beamformer 34. Each receiver channel of the receive beamformer may be coupled to a respective transducer element 31 of transducer 30, e.g., by an amplifier (not shown).

Under the direction of the master controller/host computer 40, receive beamformer 34 tracks the direction of the transmitted beam, sampling the echo signals at a succession of ranges along each beam. Receive beamformer 34 imports the proper time delays and other receive parameters for each amplified echo signal, and sums the delayed echo signals to provide a summed echo signal which accurately indicates the total ultrasonic energy reflected from a point located at a particular range along one ultrasonic beam. The received focus time delays are computed in real-time using hardware or are read from a look-up table. The received channels may also have circuitry for filtering the received pulses, e.g., noise filters. The summed time-delayed receive signals are supplied to a signal processor, which is shown in FIG. 1A as master controller/host computer 40. The host computer 40 converts the summed receive signals to display data via a compound and display processing module 68. The host computer is also configured, via a B/A computation module 70, to compute a quantity representative of the B/A using an output of the SoVF 44 (e.g., a ratio of quadratic to linear energy components via filter kernels 62, 50).

Most of the components of the ultrasound imaging system 10 so far described provide for a standard architecture of a pulse echo ultrasonic imaging system. Such components of the ultrasound imaging system 10 thus far described, excluding the SoVF 44, B/A computation module 70 (e.g., a processor 70), and certain software that will be described further below which forms a part of master controller/host computer 40 (e.g., processor 40), generally take the form of any standard architecture that may be beneficially modified according to the present disclosure. In other words, standard transducers, transmit and receive beamformers, and other devices necessary to provide a standard pulse echo ultrasonic image on a display can be used according to the present disclosure.

As described above, and as shown in FIGS. 1A and 1B, the beamformed data provided to the master controller/host computer 40 may also be provided by receive beamformer 34 under control of master controller/host computer 40 to post-beamforming SoVF 44. The SoVF 44 represents any dynamic nonlinear post-beamforming filter capable of separating the linear and nonlinear components of the beamformed data. As shown, the SoVF 44 includes a plurality of filter kernels including a linear kernel 50 and at least one nonlinear kernel 62 (a quadratic kernel). Although only a quadratic kernel 62 is shown in FIG. 1A, it is understood that more than one nonlinear kernel 62 may be included, such as one or more pth-power filter kernels, where p is an integer greater than 2.

The SoVF 44 may be implemented as any programmable filter wherein linear and nonlinear filter kernels are defined by coefficients. For example, the SoVF 44 may be either a finite impulse response (FIR) or an infinite impulse response (IIR) filter. Preferably, the filter is a programmable digital filter, although any type of filter capable of performing the functionality as described herein may be used. The SoVF 44 operates to separate linear and nonlinear components of beamformed data based on a second order Volterra model in a manner described in details hereinbelow. Additional details of an ultrasound imaging system that can be implemented in accordance with the present disclosure is disclosed in commonly-owned U.S. Pat. No. 6,951,540, which is incorporated herein by reference in its entirety.

The illustrative ultrasound imaging system 10 is configured to carry out the ultrasound imaging method shown in FIG. 2. The ultrasound imaging method shown in FIG. 2 involves insonifying 102 at least a portion of region 12 (see FIG. 1A) with acoustic wave energy having a pulse spectrum centered at a fundamental frequency, $f_0$ (block 102). Wave energy returned from the region 12 in response to the insonification (e.g., echo) is transduced to provide received signals (block 104). Such received signals, e.g., which may be operated upon by a beamformer, result in image data that may be filtered according to the present disclosure.

As further shown in FIG. 2, the received signals, e.g., image data, may be separated into linear and nonlinear components of the received signals based on a second order Volterra model. Such filtering is preferably performed by applying a SoVF 44 to the image data (block 106). The SoVF 44 is defined by coefficients (block 108) for a linear filter kernel (e.g., kernel 50 of FIG. 1A) and for a nonlinear filter kernel (e.g., quadratic filter kernel 60 of FIG. 1A) of the SoVF 44, and involves learning the kernel (block 105) from the echo data in the region 12 of interest (e.g., in a manner disclosed in commonly-owned U.S. Pat. No. 6,951,540, which is incorporated herein by reference). Such filter coefficients are provided, e.g., identified, from wave energy (e.g., echo) returned in response to a pulse of wave energy provided into the region 12, in a manner described in detail hereinbelow. It is noted that the kernel can be modified in a manner described in detail hereinbelow.

The filtered received signals can then be processed and employed for various functions (blocks 110, 112, 114). For example, at least one or more nonlinear components of the filtered received signals are provided to a processor for displaying an image based thereon (block 110). In addition, for example, the linear components and at least a portion of the nonlinear components may be compounded and/or compared by the processor for use in analysis and/or display of images. Additionally or alternatively, the linear and nonlinear components may be processed (block 112) by a processor to compute a quantity representative of the B/A. Such computations by the processor can include an identification of tissue characteristics based on the B/A. For example, tissue has a B/A of about 5 to about 12. Tissue with high fat infiltration can have a B/A of about 9 to about 10. The computed B/A can be compared to B/A values established for different tissue characteristics. As such, the computed B/A quantity can be used to quantitatively assess and identify the characteristics of tissue subject to ultrasound imaging. Additionally or alternatively, the linear and non-linear components may be processed by a processor to compute a quantity representative of the C/A. Such computations can include an identification of tissue characteristics based on the C/A. For example, the computed C/A can be compared to C/A values established for different tissue characteristics.

The Acoustic Nonlinearity Parameters B/A and C/A

Ultrasound is a finite-amplitude wave, which is fundamentally nonlinear. The presence of an ultrasound wave at measurable levels results in disturbance to the medium, which results in nonlinear propagation. The ratio B/A, which is commonly used in the field of nonlinear acoustics, is derived from the Taylor series expansion of the variations of the pressure in medium in terms of the variations in the density. The quantity B/A is proportional to the ratio of the coefficients of the quadratic and linear terms of the Taylor series.

For simplicity, we assume a progressive plane wave propagating in the z direction and a Taylor series expansion of the equation of state P=P (ρ,s) along the isentrope $s=s_0$. This yields: ruler $$P - P_0 = \left(\frac{\partial P}{\partial \rho}\right)(\rho - \rho_0) + \frac{1}{2!}\left(\frac{\partial^2 P}{\partial \rho^2}\right)(\rho - \rho_0)^2 + \frac{1}{3!}\left(\frac{\partial^3 P}{\partial \rho^3}\right)(\rho - \rho_0)^3 + \ldots ,$$ (A)

where P and ρ are pressure and density, respectively, $P_0$ and $\rho_0$ are their unperturbed or ambient values, and s is the specific entropy. A more succinct form of the equation is given in terms of $p=P-P_0$ and $\rho'=\rho-\rho_0$:

$$p = A\left(\frac{\rho'}{\rho_0}\right) + \frac{B}{2!}\left(\frac{\rho'}{\rho_0}\right)^2 + \frac{C}{3!}\left(\frac{\rho'}{\rho_0}\right)^3 + \ldots ,$$ (B)

Where $$A = \rho_0\left(\frac{\partial P}{\partial \rho}\right) \equiv \rho_0 c_0^2$$ (C)

$$B = \rho_0^2\left(\frac{\partial^2 P}{\partial \rho^2}\right)_{s,0} .$$ (D)

$$C = \rho_0^3\left(\frac{\partial^3 P}{\partial \rho^3}\right)_{s,0} .$$ (E)

Although there are several definitions of the ratio B/A, a ratio of equations C and D above suffice for purposes of this disclosure. Similarly, although there are several definitions of the ratio C/A, a ratio of equations C and E above suffice for purposes of this disclosure. The C/A ratio can be obtained using a third-order Volterra filter to separate the linear, quadratic, and cubic components of the echo signal.

Determination of the B/A

The following discussion assumes use of the finite amplitude method, which is one of several described in the literature. When a plane wave of finite amplitude travels through a medium, it becomes distorted, leading to generation of higher harmonics. For mild nonlinearity, the second harmonic pressure amplitude $p_2$ is still considerably larger than the pressure amplitudes of all higher harmonics. Under this assumption, we have the following solution:

$$p_2(z, \tau) = \frac{\beta p_0^2 \omega}{4\rho_0^2 c_0^3} f(z), \quad f(z) = \frac{e^{-2\alpha_1 z} - e^{-\alpha_2 z}}{\alpha_2 - 2\alpha_1}$$ (F)

Where ω is the angular frequency at the source and $\alpha_1$ and $\alpha_2$ are the attenuation coefficients at the fundamental and second harmonic frequencies, respectively, and $$\beta = 1 + \frac{B}{2A}.$$

A second order Volterra filter model (described below) is used to estimate the parameter β from the linear and quadratic components resulting from processing the echo data to separate these quantities.

Second harmonic amplitude to fundamental energy ratio $p_2/p_0^2$ will approximately be proportional to the average quadratic amplitude Q to average linear energy $L^2$ ratio:

$$\beta = \frac{2\rho_0^2 c_0^3}{\omega F(z)} \frac{E[|Q|]}{E[|L^2|]}$$

This is an approximation that can be applied to conventional harmonic generation models when the transmit waveform is a narrowband signal with clear separation between the fundamental and second harmonic components. In other words, this is applicable when the quadratic component is simply estimated by a bandpass filter centered around the expected second harmonic frequency. However, when broadband ultrasound waveforms are used, the quadratic interactions are generally complex with the potential for quadratic component generation due to any arbitrary quadratic frequency interaction at a frequency pair ($f_i$, $f_j$).

Under these conditions, an estimate of the B/A based on a modified formula for $\beta$ is given by the following:

$$B/A = 2\left[K\frac{2\rho_0^2 c_0^3}{\omega f(z)} \frac{E[|Q|]}{\sum_i E[|L_i^2|]n_i} - 1\right]$$

where $p_0$ and $p_2$ are the pressure amplitudes (kPa) at the fundamental and 2nd harmonic, $\omega$ the angular frequency, $\rho_0$ the nominal density of the medium (Kg/m$^3$), $c_0$ the nominal speed of sound in the medium (m/s), $\alpha$ the attenuation coefficient (dB/cm/MHz), $\alpha_1$ and $\alpha_2$ are the attenuation coefficients for fundamental and 2nd harmonic components, $\beta$ is the modified nonlinearity coefficient in liquid, K is a proportionality constant accounting for the reflectivity of the fundamental and 2nd harmonic components, and n is the number of unique energy peaks in the 2D quadratic kernel along each integration line $f=f_1+f_2$.

Figures 5A, 5B:
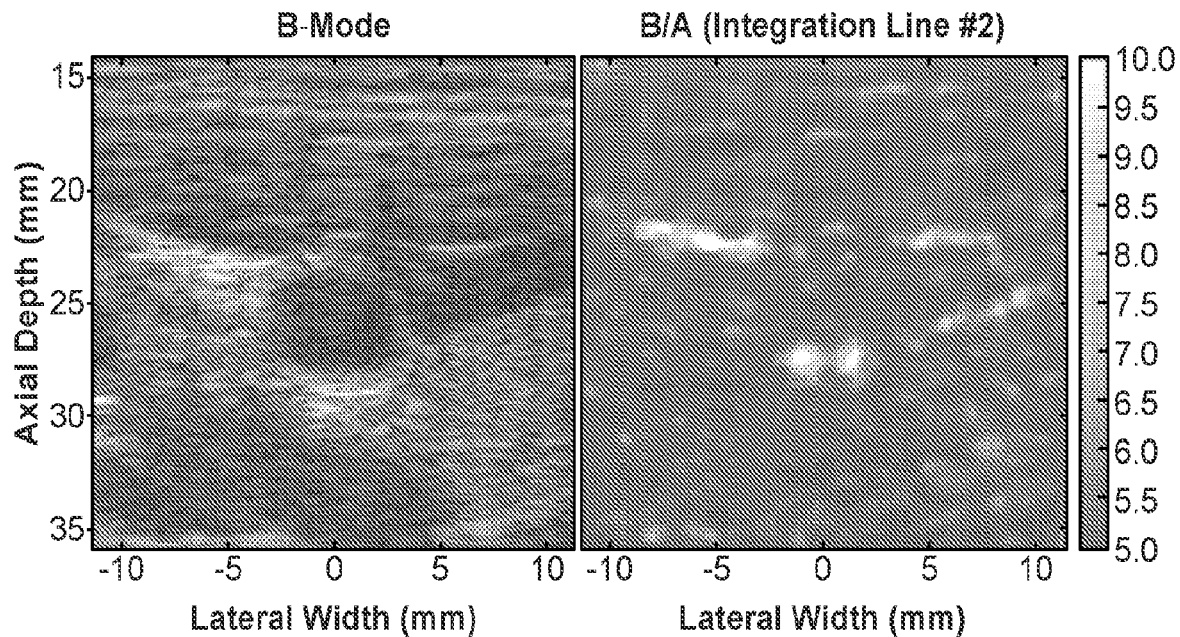
FIGS. 5A-5C show another example B/A image (FIG. 5B) obtained from the same B-mode image data (FIG. 5A) as in the previous figure.
Figure 5C:
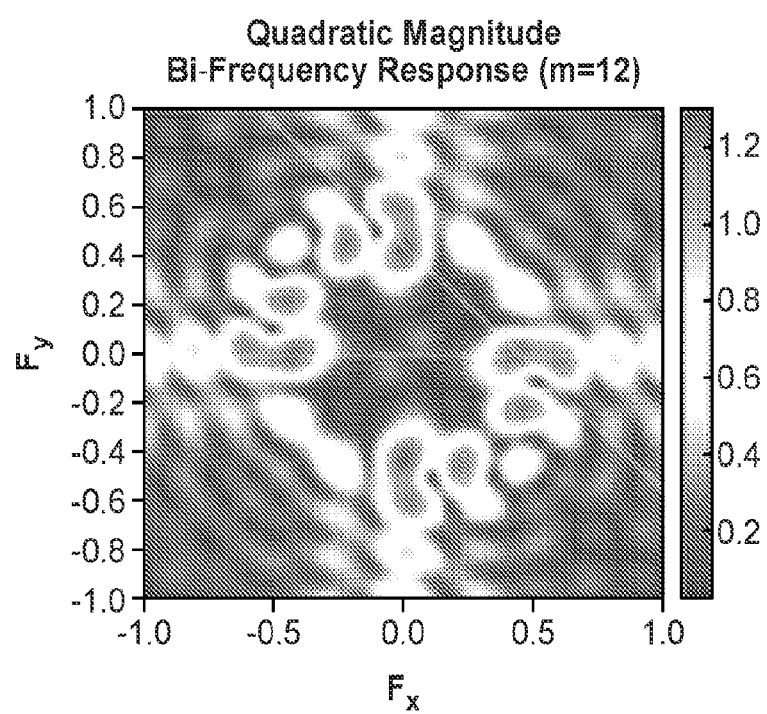

The frequency interactions are illustrated as shown in FIGS. 3A-3C, which shows the observed spectra (FIG. 3A left), the underlying bifrequency response of the quadratic kernel of the SoVF (Second order Volterra Filter, FIG. 3B middle) and a schematic representation of the bifrequency quadratic signal distribution (FIG. 3C right). The white diagonal lines over the bifrequency response shown in FIG. 3B represent the integration lines over the sum frequency components $f=f_1+f_2$, where $f$ is the observed frequency, i.e., corresponding to the horizontal white line or the abscissa. The observed quadratic signal spectrum is given by:

$$Y_Q(f) = \int H_Q(f_1, f - f_1)X(f_1)X(f - f_1)df_1$$

where $H_Q(f_1, f_2)$ is the bifrequency response of the quadratic kernel $h_Q$. The integration is along the lines $f=f_1+f_2$ where the bifrequency response of the quadratic kernel provides a weighting of the original signal components at $f_1$ and $f_2$. As an example of the feasibility of imaging the B/A parameter using the SoVF, reference is made to an in vivo imaging result (FIGS. 4A-4C) of a plaque using a diagnostic ultrasound system. FIG. 4A shows the B-mode image of the femoral artery of a familial hypercholesterolemic swine with a plaque at the distal wall of the target vessel. The plaque appears to be hyperechoic on the B-mode image. On the other hand, it is very prominent on the B/A image (FIG. 4B). This represents an application of the disclosed methodology of using B/A imaging to characterize vulnerable plaques that are known to have high lipid content. FIGS. 5A-5C show another example B/A image obtained from the same B-mode image data as in the previous figure.

Band Selective Quadratic Volterra Kernel Synthesis for Diagnostic Ultrasound Imaging Although Tissue Harmonic Imaging has been studied for decades and it is a well established technique for generating high quality and artifacts free ultrasound images, limited bandwidth degrades the spatial resolution compromising overall image quality. A modified form of Volterra filter is disclosed herein which is capable of generating nonlinear images without degrading its axial resolution. A data-driven least square algorithm is used to learn the coefficients of a Second order Volterra Filter (SoVF). Applying Singular Value Decomposition (SVD) and analyzing the singular modes individually results in multiple filters which capture localized quadratic energy interaction throughout the whole frequency spectrum. The kernels are further processed using 2D Gaussian operators to isolate the relevant primary bifrequency peaks and suppress the incoherent ones. This is followed by a final quadratic kernel synthesis where individual Gaussian-filtered kernels are summed coherently after accounting for the phase delay in RF domain and are used, for example, to reconstruct the quadratic images.

Preliminary experimental results demonstrate the advantage of the proposed approach in preserving the axial resolution while improving lateral resolution and image contrast. These results pave the way for investigating the kernel design approach in improving the specificity of quadratic imaging of microbubble activity in medical applications such as ultrasound contrast agent imaging and image-guided focused ultrasound therapies.

Ultrasound wave propagation through a medium suffers from progressive nonlinear distortion caused by positional shift of peak compression and peak rarefaction, giving rise to higher order harmonic components. In its extreme form, the two peaks and the zero-crossings eventually coincide to form an acoustic shock as the wave continues to propagate. Nonlinear distortion of such degree can be easily observed in therapeutic applications due to their significantly higher value of transmit pulse amplitude. Lithotripsy is one of the examples, where shock wave generation near the focal region is used to fragment kidney stones. Another useful field of study involves heating of very specific and localized tissue region of interest by application of High Intensity Focused Ultrasound (HIFU), which is enhanced by progressive distortion due to nonlinear acoustic propagation.

The present disclosure primarily focuses on engineering advantages of nonlinear ultrasound propagation in diagnostic applications. The degree of nonlinear distortion is a function of several factors such as the incident beam energy and its frequency, the axial distance from the source due to its cumulative nature, and the medium itself. In order to improve axial resolution and sensitivity, a short and high amplitude transmit pulse is usually used to excite the transducer in diagnostic applications, which is often sufficient to drive the system into nonlinearity. As a result, the echo signals from deeper tissue regions progressively get richer in higher order harmonics, which are finally received by the transducer, assuming the transducer to be wide-band in nature. For an imaging application, it is undesirable to have incoherent carriers at multiple bands generated by nonlinear distortion which can potentially degrade diagnostic quality of B-mode images. Therefore, the first instinct is to remove higher harmonics present in the echo signals prior to image reconstruction. However, it is widely accepted and thoroughly studied that ultrasound B-mode images reconstructed using higher harmonic echo components have significant advantages over conventional images such as reduced side-lobe artifacts, improved lateral resolution, clutter and reverberation suppression, improved contrast to noise ratio etc. Hence, one objective of this disclosure is to present a unique method to reconstruct high quality ultrasound images using nonlinearly interacting echo components.

For many decades, researchers have approached this problem with different perspectives. Tissue Harmonic Imaging is one of the widely studied methods where the received echo signals are processed using a band-pass filter with center frequency around the second harmonic and a finite bandwidth to retain only the second harmonic echo components, which are used to reconstruct US images. However, poor axial resolution due to limited bandwidth and difficulty to efficiently eliminate the fundamental signal without losing harmonic components for a broadband signal are some of the drawbacks of this method. This can be overcome by a method known as Pulse Inversion (PI) technique where two pulses with 180 phase difference are transmitted consecutively and an ultrasound (US) image is reconstructed by summing up the two sets of received echo signals. This method enjoys full system bandwidth by retaining only the even harmonics and suppressing the odd ones without any loss of bandwidth which helps maintain the axial resolution. However, this method suffers from reduced temporal resolution and is vulnerable to image artifacts caused by slight tissue motion.

The issues mentioned above are addressed by a Polynomial Signal Processing approach which uses a Volterra filter to capture nonlinear signal interactions to reconstruct an image while enjoying the entire system bandwidth. A Volterra filter is one of the oldest and widely studied methods for nonlinear signal processing which is extensively applied in many fields such as acoustic noise cancellation, biomedical signal processing, communication systems, fluid mechanics etc. Ultrasound imaging is one of the many applications where the Volterra filter has been successfully applied to reconstruct nonlinear images for diagnostic quality enhancement. Without loss of generality, quadratic Volterra filters are widely studied because of their straightforward analysis and comparatively easier implementation, but the same idea could be generalized to design and analyze higher order Volterra filters (e.g., cubic Volterra filters). Moreover, in most natural systems, the second harmonic is the one which is most prominently observed and strengths of the rest of the harmonics gradually decrease, which again justifies popularity of quadratic filters.

Volterra filters have been applied to ultrasound imaging applications in the past with higher success. However, the filters designed in the previously reported work were severely biased by dominant energy interaction, and did not let other minor nonlinear interactions to be captured. Also, there was no demonstration of any quantitative or qualitative analysis of suppression of imaging artifacts or improvement in spatial resolution in the previous work.

Embodiments of the disclosure are directed to a band selective Volterra filtering approach where multiple quadratic kernels are synthesized to capture specific frequency interactions throughout the whole spectrum irrespective of their participating energy. In the following discussion, the theoretical concepts and mathematical formulations of the proposed method are introduced. An experimental setup, imaging dataset, and figures of merit used in the work are also presented. A discussion of the results and superior performance of the proposed filter design technique are presented, followed by a summary of some of the key points.

Theory

Polynomial Signal Processing forms the basis of the disclosed algorithm to capture nonlinear signal interactions. The post-processing methods such as Singular Value Decomposition (SVD), 2D Gaussian filtering and coherent kernel synthesis are used to enhance the performance by localizing and isolating specific frequency interaction of interest. The following discussion explains the mathematical basis of the theory used to design the Volterra filter. It is understood that the algorithms, equations, and processes disclosed herein can be implemented by a Volterra filter and/or one or more processors or computers, which may be components of an ultrasound transducer device or system.

Volterra Filter

Linear filters are simple to analyze and easier to implement, but they cannot model underlying nonlinear behavior of a real physical system. In order to better understand a system under consideration, it is important to account for the higher order terms, which is accomplished by Volterra series expansion. Volterra series is a generalization of Taylor's series expansion with finite memory. In this dislcosure, the analysis focuses on second order nonlinear terms, although third or higher order nonlinear terms can also be considered. A discrete-time second order Volterra system with a finite memory N is given as:

$$y[n] = h_0 + \sum_{n_1=0}^{N-1} h_1[n_1]x[n-n_1] + \sum_{n_1=0}^{N-1}\sum_{n_2=0}^{N-1} h_2[n_1, n_2]x[n-n_1]x[n-n_2] \quad (1)$$

where x[n] and y[n] represent input and output of the system respectively, and $h_0$, $h_1$, $h_2$ are Volterra kernels of order 0, 1 and 2 respectively.

As seen in equation (1) above, the zeroth order Volterra kernel, $h_0$, is simply a constant term, which captures DC bias present in the system. The first order Volterra kernel, $h_1$, a one dimensional filter of length N, is associated with the delayed input signals, which is why it is also called the linear kernel of the Volterra filter. The linear Volterra kernel can be understood as a digital FIR filter of order N. Next, the second order Volterra kernel, $h_2$, is associated with second order cross products of the delayed input signals, which is also called as the quadratic kernel of the Volterra system. For computational efficiency, the symmetry of the data matrix can be exploited and the redundant 2D quadratic kernel of size N×N can be substituted by a vector of size $$\frac{N(N+1)}{2}$$

by considering only the lower (or the upper) triangular part of the original matrix.

Although both filter design and data processing steps are done in time domain following equation (1), some intermediate steps to synthesize a well behaving kernel may require frequency domain information. This is achieved by computing the Discrete Fourier Transform (DFT) of equation (1) as below $$Y[k] = h_0\delta[k] + H_1[k]X[k] + \sum_{k_1,k_2=0 k_1+k_2=k,k+N}^{N-1} H_2[k_1, k_2]X[k_1]X[k_2] \quad (2)$$

The first two terms on the right hand side of equation (2) follow basic Fourier Transform (FT) properties. The zeroth order term is a constant and its FT is simply a delta function. Another useful FT property, which states that the FT of convolution of two signals in time domain is equal to the product of the FT of the individual signals, is applied to the linear component of the Volterra system. However, the quadratic term needs a careful FT analysis.

The time domain expression of the quadratic part in equation (1) can be thought of as a two dimensional convolution evaluated along the diagonal line $n_1=n_2=n$. The previously used convolution property still holds good (to some extent) that can be justified by looking at the quadratic term in equation (2), which is a product of FT of the quadratic Volterra kernel (also known as the bifrequency response) and FT of the input signals. However, the time domain restriction of evaluation of two dimensional convolution along the diagonal line imposes an equivalent Fourier domain constraint as seen in equation (2), which requires that the interacting frequencies $k_1$, $k_2$ should sum up to the observed frequency k. In other words, the quadratic output at an observed frequency k is computed by summing the values of anti-diagonal line defined by $k_1+k_2=k$ (also referred to as frequency integration/summation line).

Least Squares Coefficient Learning

An initial step of Volterra filter design is to learn the coefficient values by using a Least-Squares algorithm. The training input samples are obtained by considering several signal samples of a few selected A-lines of the US images. In cases where access to input and output data mandated by a System Identification model is not possible, the next signal sample can be used as the output similar to a predictive filter. Next, the augmented input and coefficient vector is formed as below.

$$X(n) = \left[1, X_1^T(n), X_2^T(n)\right] \quad (3)$$

and $$H(n) = \left[h_0, H_1^T(n), H_2^T(n)\right] \quad (4)$$

where $X_1(n)$ and $H_1(n)$ represent the first order data and the linear Volterra kernel respectively. Similarly $X_2(n)$ and $H_2(n)$ represent the second order data with the non-redundant lower triangular cross-terms and the reduced complexity vector form of quadratic Volterra kernel respectively. The output of the nonlinear system can be rewritten in a compact form as:

$$y(n) = X^T(n)H(n) \quad (5)$$

An optimal filter is obtained by minimizing the mean square error (MSE) of the system. If d(n) is the output of the system, then the mean square error is given by:

$$E\{e^2(n)\} = E\{(d(n) - X^T(n)H(n))^2\} \quad (6)$$

where E{.} represents the statistical expectation of the parameter.

The minimum mean square error (MMSE) formulation leads to a compact expression for the optimal filter as given below:

$$H_{opt} = R_{xx}^{-1} P_{dx} \quad (7)$$

where $$R_{xx} = E\{X(n)X^T(n)\} \quad (8)$$

is the statistical autocorrelation matrix of the input vector and $$P_{dx} = E\{d(n)X(n)\} \quad (9)$$

is the statistical cross-correlation vector of the desired response and the input.

In practice, the above statistical quantities are not known a-priori, so the MMSE solution is generally not feasible. However, the estimation problem can be approximated by a Least-Squares approach by estimating the relevant statistical parameter from particular realizations of the input and output data as follows $$\hat{R}_{xx} = \frac{1}{M}\sum_{k=1}^{M} X(k)X^T(k) \quad (10)$$

is the least-squares autocorrelation matrix and $$\hat{P}_{dx} = \frac{1}{M}\sum_{k=1}^{M} d(k)X(k) \quad (11)$$

is the least-squares cross-correlation vector where M is the number of realizations. Using the above estimated parameters, an optimal least-squares filter is formulated as follows:

$$H_{LS} = \hat{R}_{xx}^{-1}\hat{P}_{dx} \quad (12)$$

Kernel Regularization

Direct application of equation (12) for a low rank least-squares autocorrelation matrix ($\hat{R}\_xx$) can lead to an ill-behaved Volterra kernel. Kernel regularization is achieved by first decomposing the autocorrelation matrix using SVD and then penalizing for the low energy singular modes with an appropriate regularization parameter ($\gamma$) so that the low energy modes do not bump up and destabilize the solution after matrix inversion. The SVD of the least-squares autocorrelation matrix R is given by $$R = U\sum V^T \quad (13)$$

$$= \sum_{i=1}^{r} \sigma_i u_i v_i^T$$

where U, V are unitary matrices with left and right singular vectors ($u_i$ and $v_i$ respectively) as columns and $\Sigma$ is a diagonal matrix with the singular values ($\sigma_i$) as the diagonal entries and r is the rank of the matrix. The sizes of all the three matrices are the same as the original matrix R SVD essentially factorizes the matrix before its inversion and a regularization parameter $\gamma$ is added to not allow the lower singular values to dominate and disturb the solution. Using equations (12) & (13), the regularized LS filter can be rewritten as:

$$H_{LS} = \sum_{i=0}^{r} (\sigma_i u_i v_i^T + \gamma_i I)^{-1} P_{dx} \qquad (14)$$

$$= \sum_{i=0}^{r} \frac{1}{\sigma_i + \gamma_i} v_i u_i^T P_{dx}$$

$$= \sum_{i=0}^{r} \left( \frac{\sigma_i u_i^T P_{dx}}{\sigma_i^2 + \gamma} \right) v_i$$

As mentioned above, previously published work has focused on Truncated SVD (TSVD) and a criterion based SVD regularization approach which are variations of equation (14). A quality degradation in images reconstructed using the filters synthesized using such methods has been observed. In the following section, unique solutions to capture a wide range of nonlinear interactions over the full bandwidth are discussed.

Band-wise Kernel Analysis

The individual singular modes used to synthesize the LS Volterra kernel, as shown in equation (14), were observed to capture nonlinear energy interaction at specific frequency bands. For example, the first few singular modes with higher singular values captured quadratic interaction of the most dominant energy band with itself. The next few modes with lower singular values captured relatively weak nonlinear interaction at different sub-bands. The SVD regularized least-squares solution obtained by summing all the singular modes is severely biased by the quadratic interaction of the most dominant energy bands shadowing the effects of other minor frequency interaction and renders their contribution insignificant. In order to exploit quadratic energy interaction over the entire bandwidth, one unique method to synthesize multiple kernels can use individual singular modes instead of summing them up. From equation (14), r number of Volterra kernels can be synthesized using individual singular modes as below $$H_i = \left( \frac{\sigma_i u_i^T P_{dx}}{\sigma_i^2 + \gamma} \right) v_i \qquad (15)$$

The above kernels are segregated into multiple groups based on the nonlinear frequency interaction they capture after studying a bifrequency response of the individual quadratic kernels. It is believed that filters synthesized using individual singular modes, as shown in equation (15), do capture nonlinear energy interaction at different energy bands and preserve different imaging features accordingly.

Bifrequency Peak Isolation with 2D Gaussian Filters

The peaks in bifrequency response of the individual quadratic kernels derived in the previous step signify the strength of quadratic energy interactions at those frequency pairs. It was observed that some kernels had multiple peaks capturing quadratic frequency interaction of different energy bands, which were mostly incoherent and resulted in an image with poor quality, blurring, and reduced axial resolution etc. The purpose of this step is to selectively isolate the desired bifrequency peaks by suppressing the incoherent ones with the help of 2D Gaussian filters centered at the desired peaks. A 1D bandpass filtering (BPF) scheme post image reconstruction can be employed to eliminate unwanted out-of-band energy. However, it may not be possible to filter out the incoherent nonlinear energy interactions when frequency summation lines of the multiple peaks are in close proximity with each other. A traditional 1D post image reconstruction BPF method would fail in such situations, whereas a 2D Gaussian pre-filtering of a kernel designed by carefully studying its bifrequency response can be much more flexible in isolating specific frequency interaction.

Coherent Kernel Synthesis

The Gaussian filtered Volterra kernels derived in the above step are usually narrow band in nature as they are synthesized using individual singular modes. It is important to reclaim the bandwidth by summing up the individual kernels appropriately. First, the quadratic kernels having bifrequency peaks in the same vicinity are grouped together and then their raw RF A-lines are analyzed for phase coherence. It was observed that the phase responses of the individual kernels were misaligned which was evident from the resulting RF profiles. A simple sum of the kernels would result in an incoherent kernel leading to undesired effects in the images such as blurring, spatial resolution degradation etc. Thus, in this step a coherent Volterra kernel is designed by studying the raw RF A-line echo data of the individual images and then summing the kernels up after adjusting for the time delay observed in RF domain.

The coherent kernel synthesis essentially restores the filter bandwidth and results in a higher quality ultrasound image.

EXAMPLES

Quality Assurance Phantom Imaging & In-vivo Imaging

Imaging System

A clinically approved Sonix RP (Ultrasonix, Richmond, BC, Canada) system was used to collect the imaging dataset used in a study. The imaging system provides a wide range of ultrasound transducer probes for diagnosis of different types of target tissues. For the research work, two linear array probes LA14-5/38 and HST15-8/20 were used and configured to transmit standard imaging pulses at a frequency of 10 MHz. The system's user interface provides the capability to configure a wide range of parameter values during image acquisition such as imaging depth, transmit frequency, transmit power, type of data to be collected etc. The system collects raw RF data at a rate of 40 Msamples/s making the axial resolution suitable for diagnostic standard.

Quality Assurance Phantom Imaging

Figure 6:
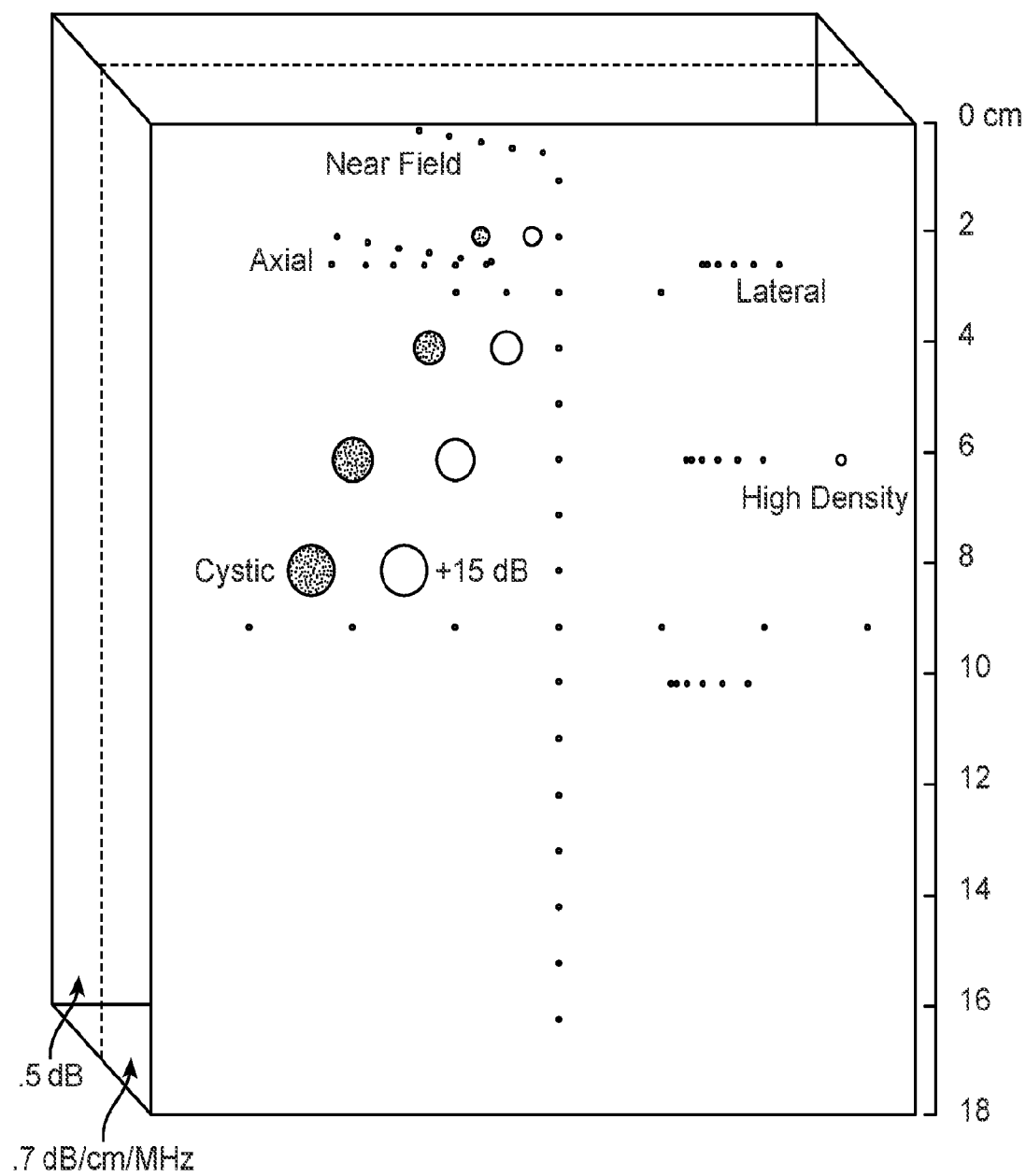
FIG. 6 shows a representative general purpose multi-tissue quality assurance ultrasound phantom used in an example experiment.

The linear array ultrasound probe LA14-5/38 was used to image a small section of a general purpose multi-tissue quality assurance ultrasound phantom by CIRS group (model 040). The phantom has a number of specific targets of interest carefully embedded in a solid elastic water-based polymer called Zerdine, as shown in FIG. 6. The wire targets made of nylon monofilament shown as the smallest dots-like structure in the FIG. 6 are 0.1 mm in diameter and are multipurpose in nature. Based on their placement in the phantom, they are used to characterize the system's resolution, echogenicity at different axial depth etc. The 4 cystic targets of different sizes displayed in dark gray color in the figure are anechoic in nature, which are used to mimic dead tissues such as a cyst or a tumor. The segment of the image used in our dataset captures only the top two cystic targets which are 2 mm and 4 mm in diameters. The high contrast targets have the same dimension as cystic targets and are located right next to them at the same axial depth. Only one high contrast target whose diameter is 4 mm is visible in the field of view and has a Contrast to Tissue Ratio (CTR) of ±15 dB.

In-vivo Dataset

A Copenhagen rat (approximately 300 g) with an LNCaP tumor artificially implanted to its hind limb was imaged with and without UCA. The linear array probe HST15-8/20 with center frequency of 10 MHz was used to study perfusion characteristics in the heterogeneous tumor. The animal was managed under Institutional Animal Care and Use Committee (IACUC) and as per the protocol it was anesthesized using Ketamine and Xylazine before the diagnosis. Several SA imaging frames were collected at a rate of 26 frames/second for a few seconds while making sure the RF data was not saturated.

After the first set of data acquisition, MicroMarker UCA (Visual Sonics, Toronto, ON, Canada), a lipid encapsulated mixture of nitrogen and perfluorobutane microbubble, with a median diameter of 2.3-2.9 m was injected (0.75 mL) through the tail vein and another set of data was collected after UCA activity was clearly visible in the B-mode images. A few seconds of data for both with and without UCA were collected to study the temporal dynamics of perfusion activity. There was a slight spatial shift of approximately 0.5 mm in axial and 1.5 mm in lateral direction (possibly in the elevation plane as well) while injecting UCA through its tail, which could be seen by comparing single frame from both the dataset. This spatial shift was taken into account while evaluating parameters and comparing performance of local region of interest (ROI). A prominently visible periodic breathing motion with a period of 1.5 seconds was accounted for while analyzing temporal dynamics of UCA and hence the perfusion activity as covered in detail in the later sections.

Performance Measurement

The following is a discusion of several figures of merit to evaluate performance of different images and compare them quantitatively. Image resolution, contrast enhancement, and artifact suppression are a few of the important parameters important for a medical imaging application. The following is a presentation of their mathematical expression and a detailed explaination of same.

Contrast to Tissue Ratio (CTR)

Tissue contrast in the context of medical imaging is defined as the ability to differentiate anatomical structures having different physical properties with higher certainty. Contrast to Tissue Ratio (CTR) is an important criterion for ultrasound images which is calculated by taking the ratio of signal power backscattered from a specific region of interest with respect to signal power of a neighboring background tissue region. An objective of an imaging technique is to maximize the absolute value of this figure as much as possible. The CTR of an image is computed as follows:

$$CTR = 10\log_{10}\left[\frac{P_{contrast}}{P_{tissue}}\right] \quad (16)$$

where P denotes the power of signal in the corresponding ROI and is defined as $$P[t] = \frac{1}{NM}\sum_{m=0}^{M-1}\sum_{n=0}^{N-1}|x[m,n,t]|^2 \quad (17)$$

where t is the frame number, M and N are the axial and lateral extent of the local ROI.

For a region with high echogenicity, it is desirable to have a positive CTR whereas an anechoic region, such as a cyst, or a hypoechoic region, such as blood vessels, report negative CTR. In such regions, the enhancement in negative contrast inherently signify clutter suppression, which is again a desirable feature of an imaging system.

Covariance Cell Size

Spatial resolution (axial and lateral) of an ultrasound image is defined as the ability of an imaging system to capture true dimension and boundary of objects and distinguish one structure from another with confidence. Qualitative analysis of image resolution in ultrasound is straightforward and is visible on B-mode images when a structure with decent echogenicity is present. In this section, however, we discuss a quantitative measure of image resolution by computing 2D autocovariance in a speckle-like region.

The first step of this analysis is to process RF raw data using an envelope detection method to obtain the magnitude image and then square it to get the intensity image. The covariance of the intensity image is computed as:

$$C_I(\Delta x) = \langle (I_1 - \langle I \rangle)(I_2 - \langle I \rangle) \rangle \quad (18)$$

where l is the intensity image and the operator $\langle . \rangle$ represents the expectation of the quantity.

The average speckle covariance cell size is used as an indirect measure of image resolution and can be computed in lateral and axial direction as below:

$$S_{CX} = \int_{-\infty}^{\infty} d(\Delta x) C_I(\Delta x)/C_I(0) \quad (19)$$

$$S_{CZ} = \int_{-\infty}^{\infty} d(\Delta z) C_I(\Delta z)/C_I(0)$$

In addition to the resolution cell size measurement, the 2D autocovariance computed in a fully developed uniform speckle region can be a useful tool to indicate presence of reverberation artifacts, which are marked by periodic correlated patterns in the covariance matrix. Absence or reduction of these patterns in images reconstructed by the proposed method can indicate suppression of acoustic artifacts, which is a desirable feature of an imaging technique.

Temporal Perfusion Index (TPI)

TPI is a quantitative measurement used to capture temporal dynamics of UCA activity. It can be defined as follows:

$$TPI(x, z, k) = \frac{\sigma_I^2(x, z, k)}{[\hat{\mu}_I(x, z, k)]^\gamma} \quad (20)$$

where $\sigma_I^2(x, z, k)$ is the variance computed at a pixel location (x, z) for a finite number of frames [k, k+1, ..., k+$N_f$]. The value of $N_f$ should be the number of frames spanning at least one breathing cycle in order to reject any calculation bias that might be introduced by motion artifact due to animal's breathing. The denominator $\hat{\mu}_I(x, z, k)$, the local mean intensity, is a normalization factor used to penalize for the high intensity pixel and is obtained by convolving with a finite support spatial averaging filter h as given below:

$$\hat{\mu}_I(x, z, k) = h(x, z) ** I(x, z, k) \quad (21)$$

The extent of the filter h is a function of range of motion over the number of frames $N_f$. The parameter $\gamma$ is another normalization factor which can be adjusted depending on context and echogenicity of the regions of interest.

Results and Discussion

The following discusses details of filter design, data processing, and comparative performance analysis, which is segregated into two segments. The first segment is a discussion of the quality assurance (QA) phantom data to establish a baseline for performance of the proposed Volterra filter in a medical imaging application. It is important that a post processing filtering method enhance diagnostic quality of images while still being able to preserve true dimension of anatomical structures with no or acceptable loss of resolution. This can be acheived using the QA phantom because of the a priori knowledge of phantom's internal structure disclosed by the manufacturer. The second segment is a discussion of the results of the Volterra filter's application to the in-vivo data for image quality enhancement and characterization of different tissue regions.

Quality Assurance Phantom Data

Figure 7B:
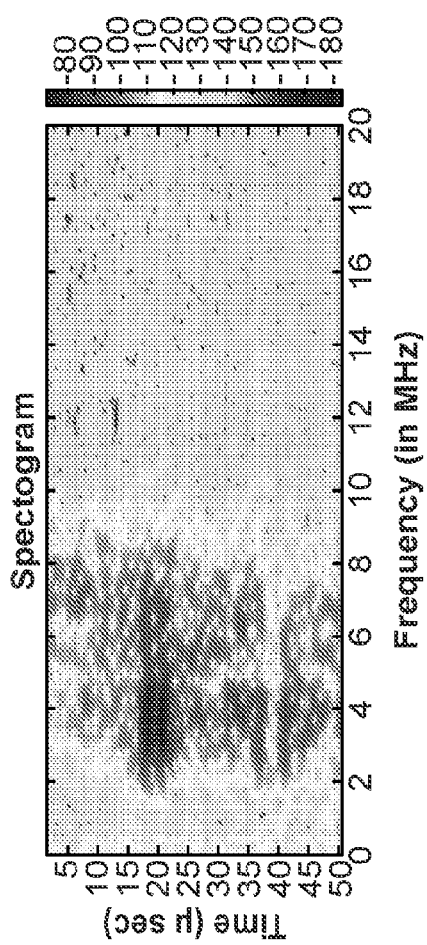
Figure 7C:
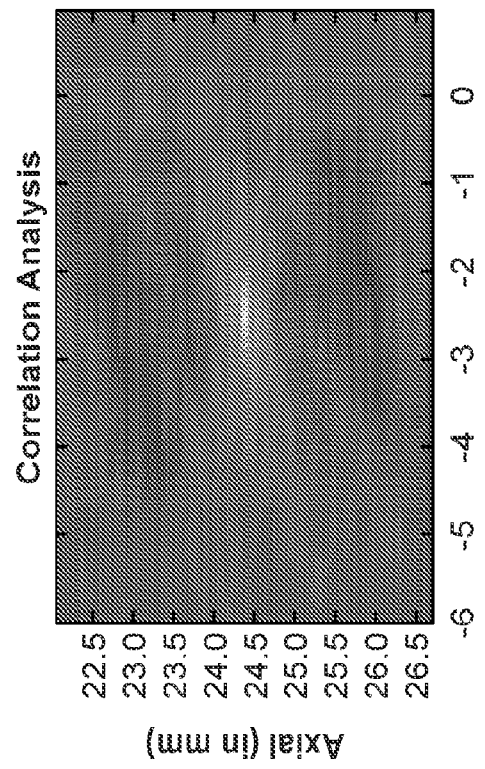
Figure 7A:
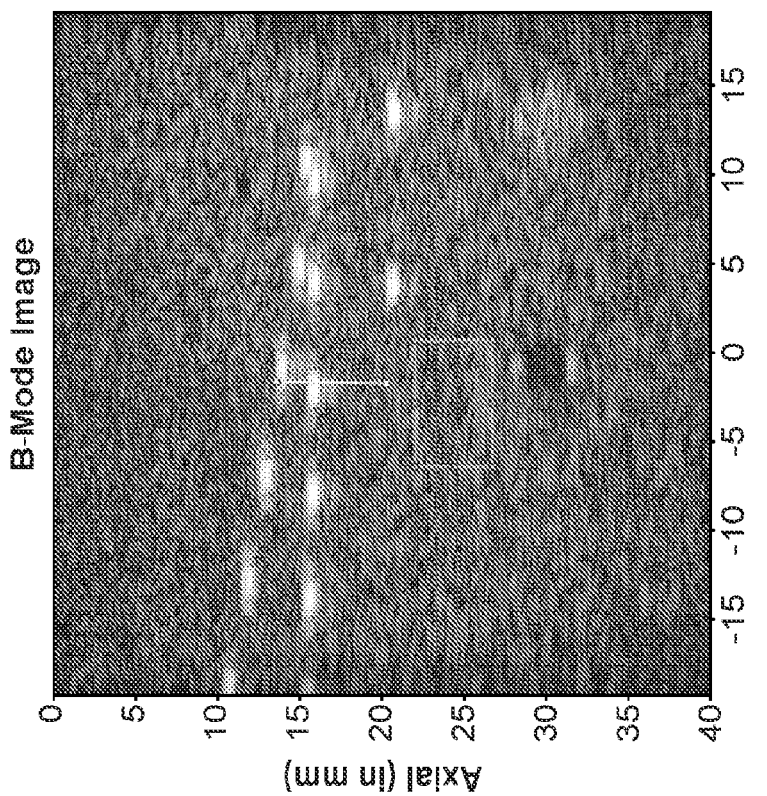

A small section of the CIRS model 040, quality assurance (QA) phantom (see FIG. 6) was imaged using the linear array probe LA14-5/38 as shown in FIG. 7(A). FIG. 7(B) shows spectrogram of the original image computed at A-line #60, which is highlighted as a green line in the B-mode image. The spectrogram reveals frequency domain information of the image as a function of time which indicates broadband nature of the RF echo data and most of its energy is focused in the range of 2 MHz to 9 MHz. Also observable is a low but noticeable level of energy present in the low frequency band, which represents DC bias in the data. FIG. 7(C) shows the covariance cell size analysis of the intensity data as explained herein.

Quadratic Volterra Filter

A modified form of SoVF of order 10 was synthesized by choosing RF data samples in a few A-line highlighted by a vertical (green) line in FIG. 7(A). The redundant form of quadratic Volterra kernel was a matrix of size 10×10. However, for computational efficiency, the 2D quadratic kernel was replaced by a vector of size $$\frac{10*11}{2} = 55$$

after exploiting symmetry in data matrix and considering either its lower or upper triangular part. After augmenting all the kernels ($h_0$, $h_1$ and $h_2$), the entire SoVF was represented by a vector with 1+10+55=66 coefficient values.

Figure 8:
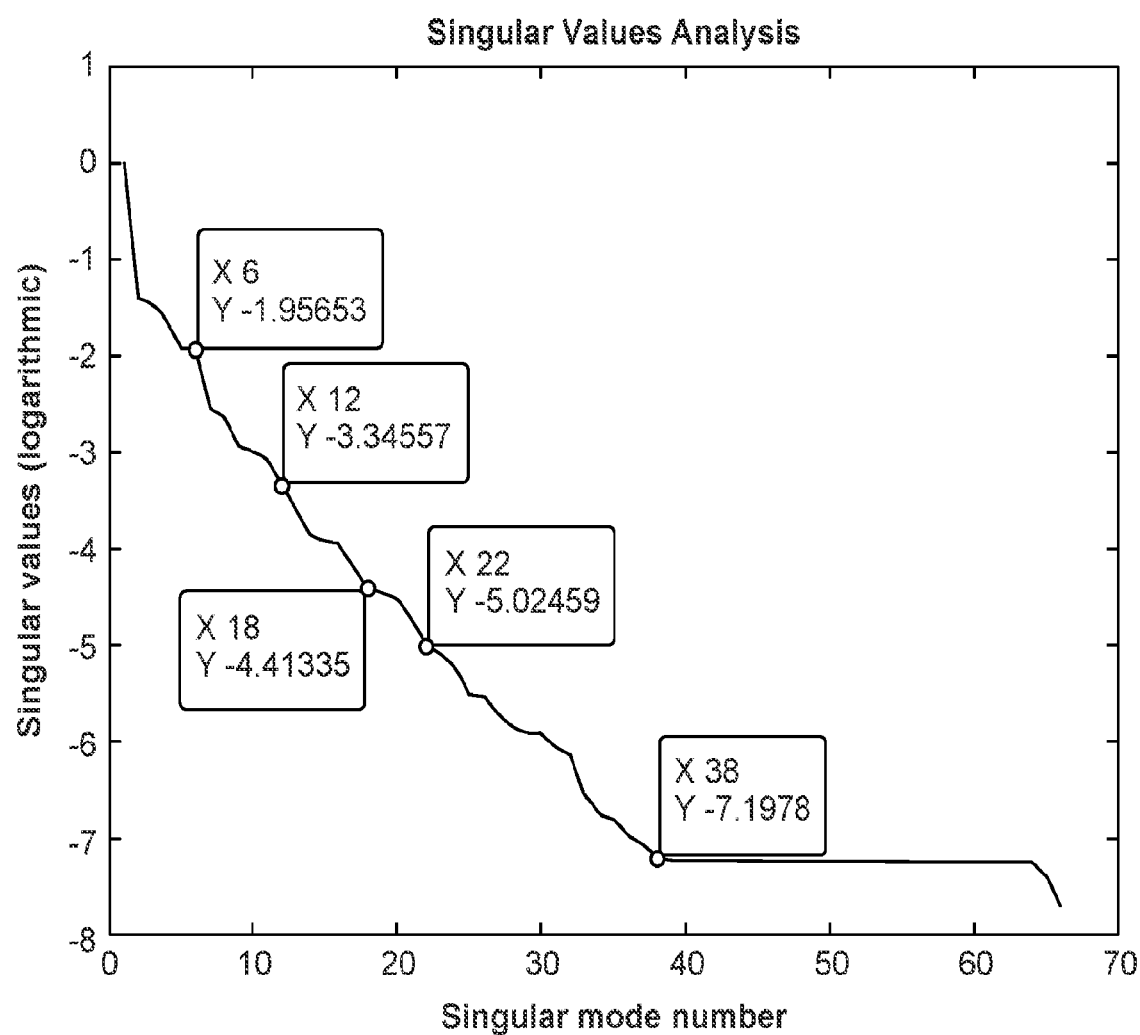
FIG. 8 is a singular values analysis showing the logarithm of singular values plotted against the singular mode numbers and a few modes of interest highlighted to demonstrate a band-wise kernel analysis and grouping approach.

As shown in equation (15), individual singular modes were used to realize multiple kernels capturing nonlinear interaction at specific energy bands. The kernels synthesized using the first few singular modes were observed to capture the dominant energy interaction in the system. The relatively weaker nonlinear interactions were captured by filters obtained using the next few modes and so on, until the singular values were almost in the noise floor and did not capture any true signal. For an augmented data vector of length 66, the size of the least-squares autocorrelation matrix was 66×66 and application of SVD resulted in 66 singular modes. FIG. 8 shows log of the singular values plotted against the singular mode numbers and a few modes of interest highlighted to demonstrate the band-wise kernel analysis and grouping approach.

Figure 9A:
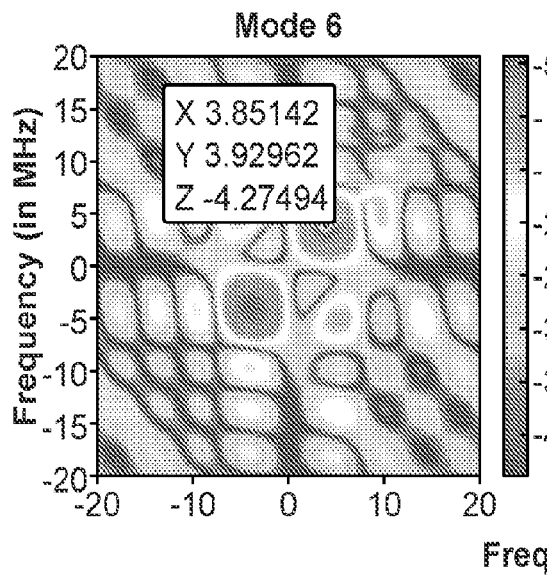
FIGS. 9A-9D illustrate an example quality assurance phantom dataset in the form of a bifrequency response analysis of quadratic Volterra kernels synthesized using individual singular modes.
Figure 9B:
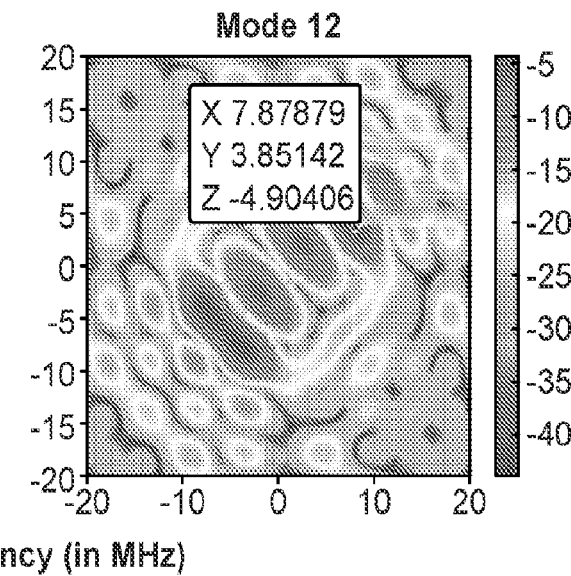
Figure 9C:
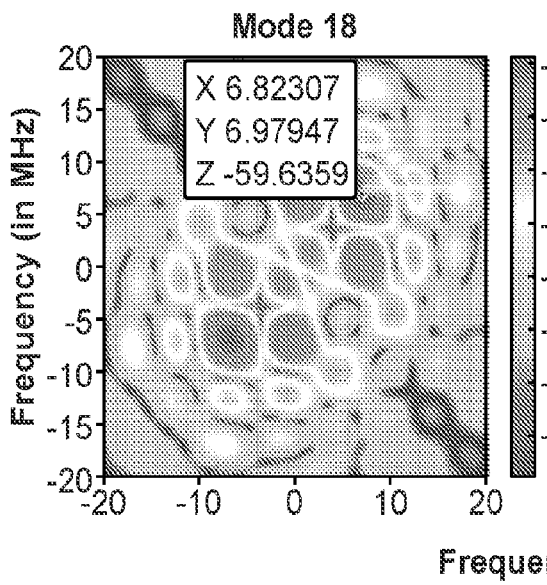
Figure 9D:
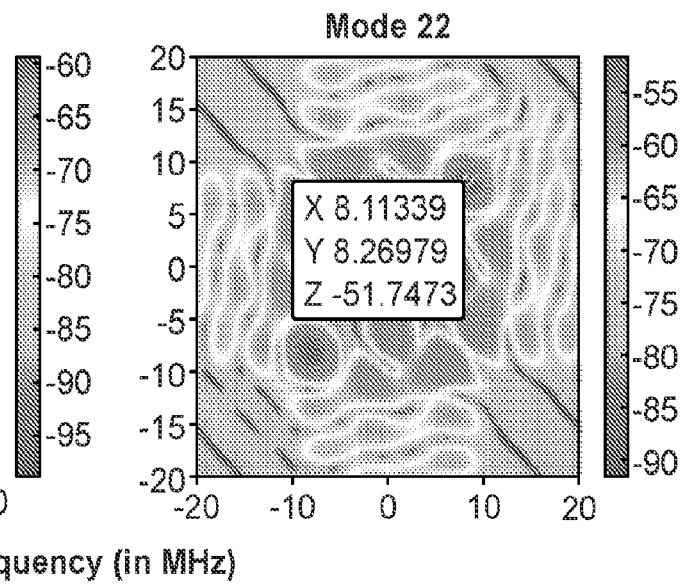

Before establishing a relationship between the singular modes and the individual Volterra kernels, it is important to note that the RF echo data is broadband in nature (as shown in the spectogram in FIG. 7(B)) and its sub-bands interact nonlinearly with each other. The kernels derived using the individual singular modes do capture specific nonlinear interaction of sub-bands, which are not necessarily coherent. For the sake of demonstration, four singular modes 6,12,18 and 22 were used as identified in FIG. 8 to synthesize four kernels and in FIGS. 9(A)-9(D) their corresponding bifrequency responses are displayed. FIG. 9A illustrates Mode 6 which captures quadratic self-interaction of sub-bands centered around 3.89 MHz with itself. FIG. 9B illustrates Mode 12 which captures quadratic cross interaction of sub-bands centered around 3.89 MHz and 7.72 MHz. FIG. 9C illustrates Mode 18 which captures quadratic self-interaction of sub-bands centered around 6.9 MHz with itself. FIG. 9D illustrates Mode 22 which captures quadratic self-interaction of sub-bands centered around 8.15 MHz with itself.

It is noted that different kernels capture quadratic energy interaction of different sub-bands and the relative strength of the bifrequency peaks is directly related to strength of the two interacting sub-bands and they gradually decrease with the singular mode number. Singular mode 38 (as highlighted in FIG. 8) marks the beginning of noise floor beyond which there is no true nonlinearity captured by the kernels. However, it was observed that the kernels obtained using modes 30 and beyond were equally noisy and did not capture any meaningful signal nonlinearity.

The next design consideration is to suppress the incoherent secondary bifrequency peaks by using 2D Gaussian filters centered around the primary (or desired) peaks. 17×17 Gaussian operators were used to convolve with the kernels in space domain. The Gaussian filtered kernels capture only the desired energy interactions and reject the incoherent ones. The RF echo A-lines of the individually reconstructed images were then analyzed group wise. For the sake of demonstration, singular modes 5,6,7, and 8 were used, the modes capturing the nonlinear interaction of the dominant energy sub-bands approximately centered around 4 MHz.

Figures 10A, 10B:
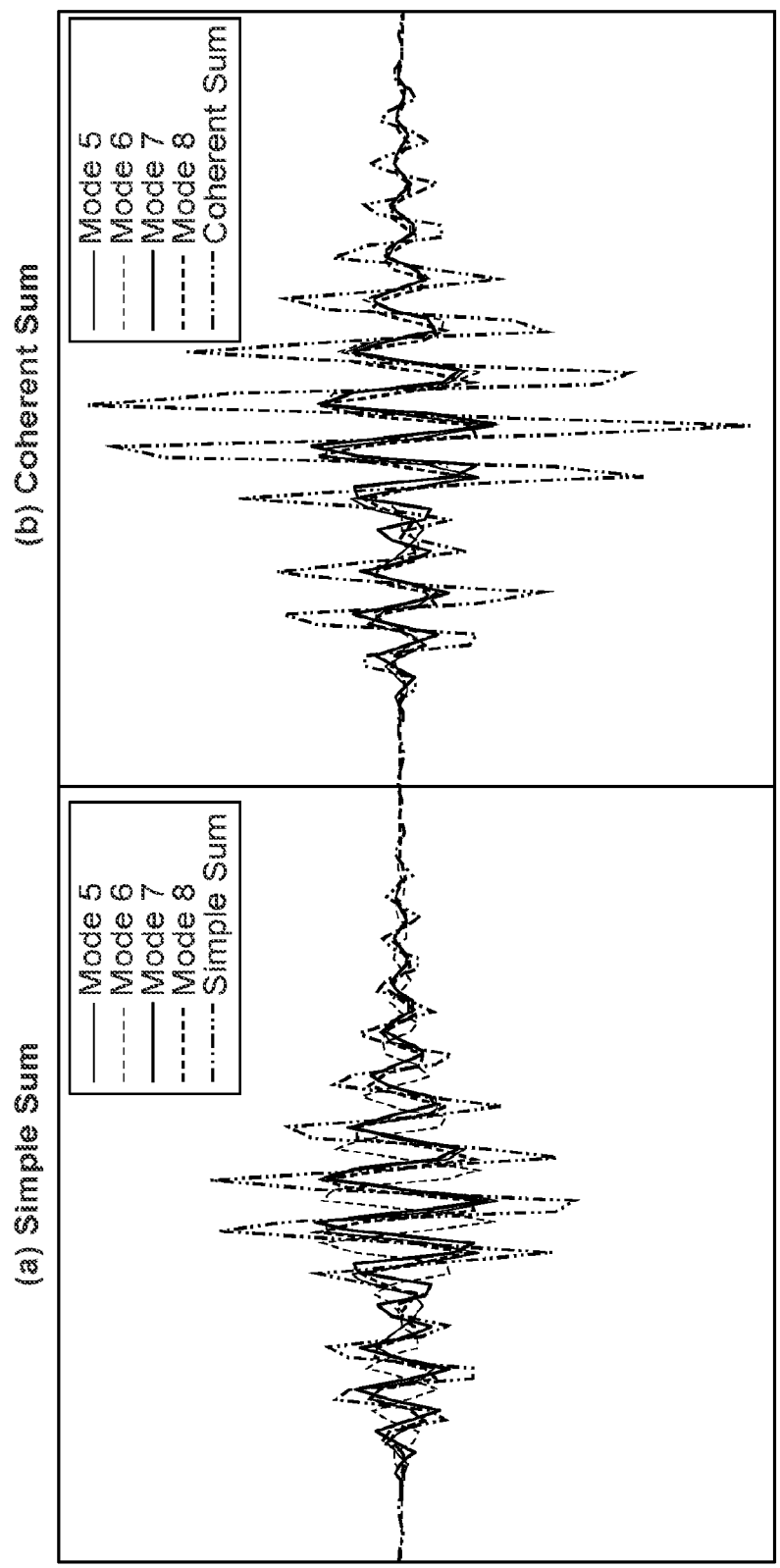

In FIG. 10(A), part of the RF A-lines of the images reconstructed using individual kernels are displayed, which are visibly misaligned with each other. In the same figure, the RF A-line of the image obtained using a kernel derived from a simple sum of the unaligned kernels is also plotted. FIG. 10(B) shows the RF A-lines of the images reconstructed using kernels after a careful delay adjustment and the one after coherently summing them up. It can be observed that the A-lines are properly aligned in FIG. 10(B) and the coherent summation of kernels leads to signal superposition and preserves the overall image resolution by combining all the relevant modes together.

Figure 12A:
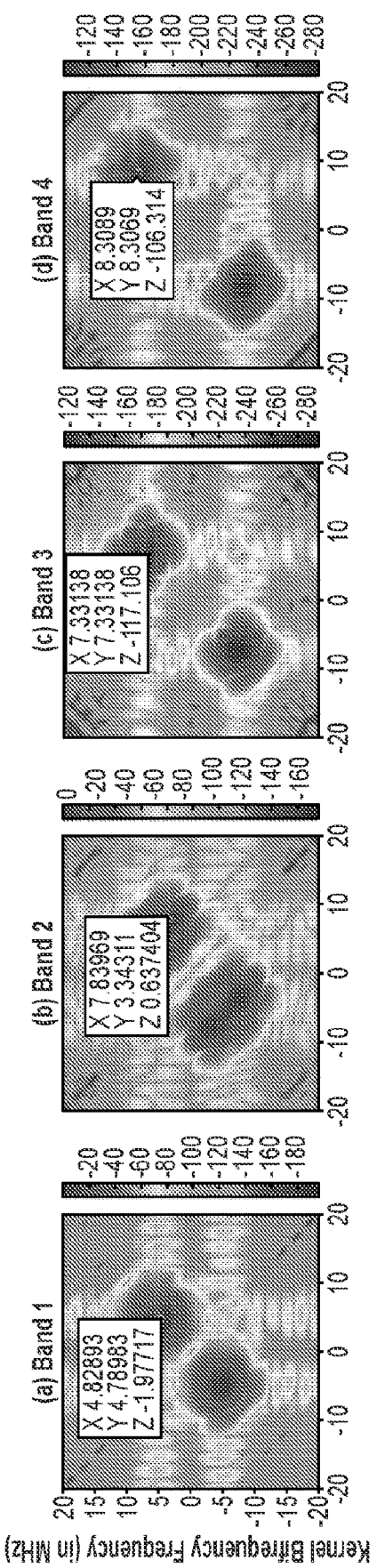
FIGS. 12A-12C illustrate an example quality assurance phantom dataset for Gaussian filtered coherent quadratic kernels synthesized for four different nonlinear energy interaction bands as defined in Table I (FIG. 11), the three rows shown in FIGS. 12A-12C displaying the bifrequency response of the quadratic kernels (FIG. 12A), their one dimensional projection computed along the frequency summation line (FIG. 12B), and QB-mode images (FIG. 12C)
Figure 12B:
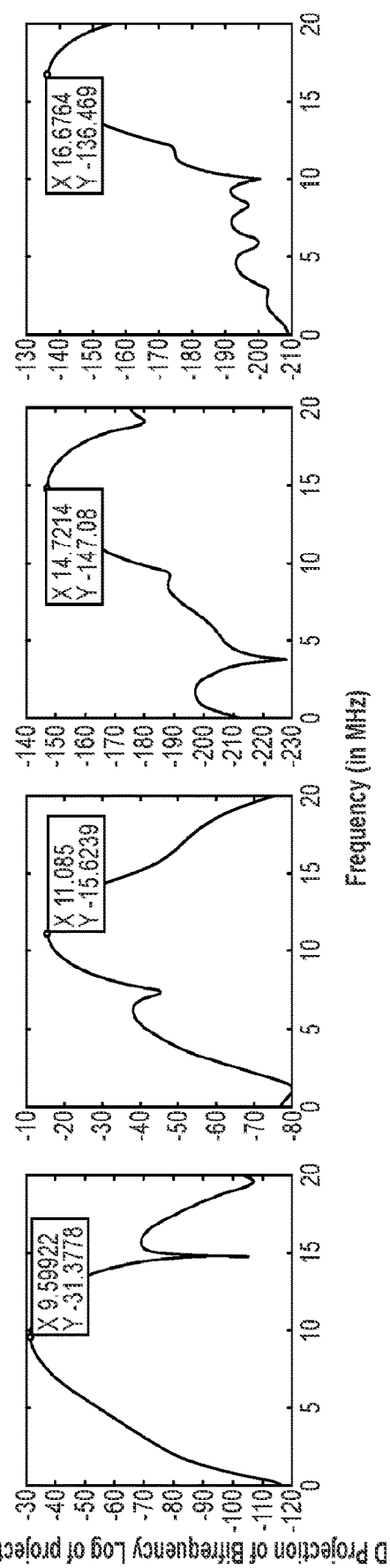

In Table I shown in FIG. 11, the singular modes are divided into four groups (Bands 1-4) based on quadratic activities of the corresponding kernels. FIG. 12(A) shows bifrequency responses of the above four quadratic kernels with their peaks highlighted. FIG. 12(B) shows one dimensional projection of bifrequency response of the kernels computed by summing the kernel values along the frequency summation line.

Quadratic Imaging

Figure 12C:
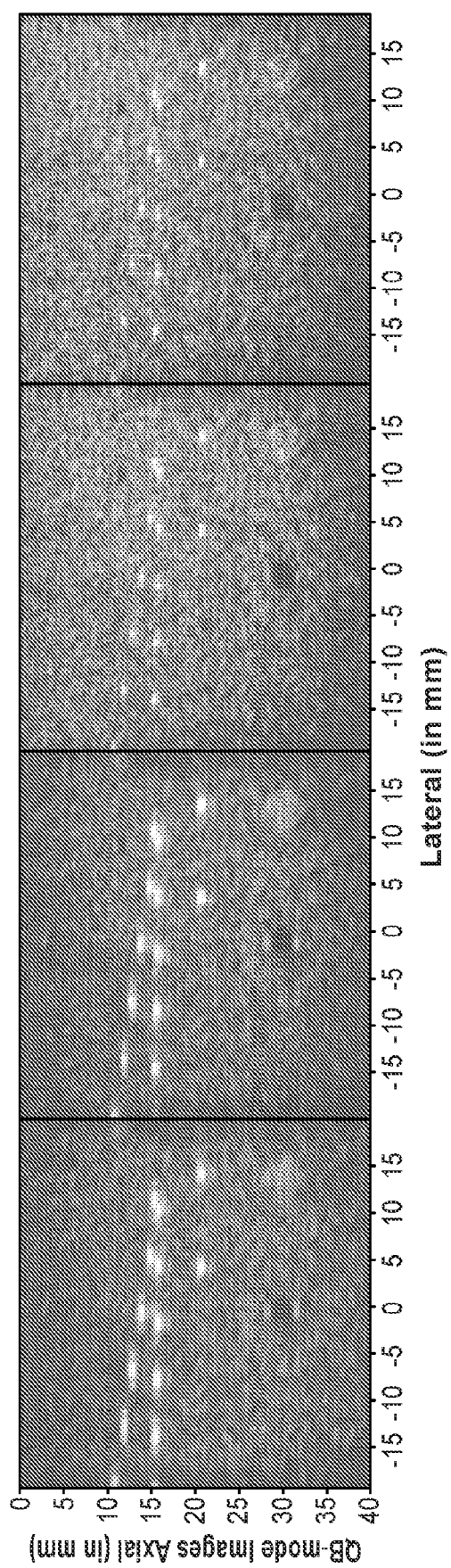

FIG. 12(C) shows QB-mode images reconstructed using filters derived in the previous step and it can be observed that they capture different imaging information from interaction of different sub-bands. The QA phantom has several interesting structures and local regions that are useful to demonstrate advantages of the disclosed Volterra filter. The following sections are segregated to discuss different aspects and features of the reconstructed images and present a comparative analysis of the broadband RF echo data and its quadratic components.

Contrast Targets

The QA phantom (see FIG. 6) has several contrast and cystic targets of different sizes at different axial and lateral locations that are used to characterize the system's contrast resolution capability. A few of these targets are captured in the field of view of the collected image. FIG. 7(A) shows one contrast target of diameter 4 mm located at (13,30), where the unit of the coordinate system is in mm, and the two points represent the lateral and axial coordinates respectively. Also noted are two cystic targets: one with diameter 2 mm located at (10,12), and the other one with 4 mm diameter at (0,30). Contrast to Tissue Ratio (CTR) for all the imaging dataset were computed at the above mentioned local regions and the values are tabulated in Table II of FIG. 13. It can be observed that all the quadratic data, especially QB 3 & 4, have higher CTR values compared to the original B-mode image. It can also be seen that the true shape of the targets are revealed by the QB-mode images 3 & 4, which report circular contrast and cystic targets. Additionally, the specular reflection artifacts observed above and below the cystic targets in the original B-mode image are significantly suppressed in the QB 3 & 4 images. However, the CTR enhancement in the case of quadratic dataset for the positive contrast target was not as significant as the cystic targets.

Wire Targets

The nylon monofilament wire targets serve multiple purposes based on their placements in the phantom. Some of the targets are used to quantify spatial resolution of the system, while some are used to assess image uniformity at different axial and lateral locations. In this section, the discussion is focused to characterize the spatial extent of the wire targets to reveal its true dimension. It was observed that the size of the wire targets acquired with the currently used imaging system was much larger than their actual physical dimension, which is 0.1 mm in diameter as reported by the manufacturer. The axial and lateral extent of some of the wire targets for B-mode and QB-mode images are tabulated in Table III of FIG. 14, which shows relatively smaller average size of the targets in the quadratic data 3 & 4, closer to its true dimension. Also, the two closely spaced wire targets around (11,15) are distinctly visible and better resolved for the QB-mode 3 & 4, which indicates improvement in spatial resolution for the quadratic images.

Tissue Region

Figures 14, 15:
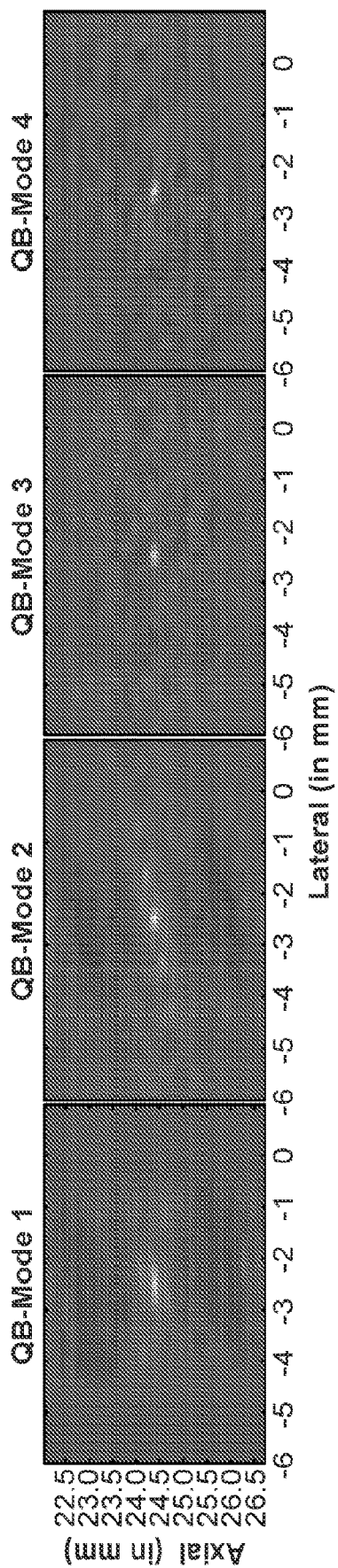
FIG. 14 illustrates an example quality assurance phantom dataset in the form of a table (Table III) including the axial and lateral extent of some of the wire targets (see FIG. 6) for B-mode and QB-mode images which are tabulated in Table III of FIG. 14.
FIG. 15 illustrates an example quality assurance phantom dataset in the form of a correlation cell size analysis of QB-mode images listed in Table III of FIG. 14, wherein the the covariance matrices shown in FIG. 15 were computed for all the quadratic imaging dataset at the local tissue region highlighted by the rectangular (red) region in FIG. 7(A) (below the vertical green line)

The QA phantom uses Zerdine, a solid elastic water-based polymer, to mimic uniform soft tissue which, with an ideal imaging system, should image uniform and fully developed speckle. Comparing FIG. 7(A) and FIG. 12(C), it can be observed that the tissue regions in QB-mode 3 & 4 images are uniform and have higher SNR than the B-mode and QB-mode 1 & 2 data. Following the previous discussion concerning covariance cell size, the covariance matrices were computed for all the quadratic imaging dataset at the local tissue region highlighted by a rectangular (red) region in FIG. 7(A) (below the vertical green line) and the matrices are shown in FIG. 15. The lateral and axial extents of the center of these matrices denote the spatial resolution and it can be observed that the quadratic data have higher image resolution compared to the original image, especially in the lateral direction. This observation is supported by quantifying the parameters in Table IV of FIG. 16, where resolution cell sizes are computed following equation (19).

Apart from quantification of image resolution, covariance analysis is a very helpful tool to characterize presence of acoustic artifacts, such as on-axis reverberation and multiple scattering etc., when computed in a uniform speckle region. These artifacts are basically multiple copies of the same structure received as reflected echo signal, and a periodic correlation pattern in the computed matrix is a strong indication of image artifacts. From FIG. 7(A) and FIG. 15, it can be observed that the B-mode and QB-mode 1 & 2 dataset have periodic patterns around the center, which suggests presence of reverberation, whereas the covariance matrices for QB-mode 3 & 4 dataset are more noise-like with a single peak in the center, which points to suppression of artifacts.

Summary Using QA Phantom Data

The CIRS QA phantom (model 040) is an excellent choice to validate applicability of the disclosed filtering scheme to ultrasound images and evaluate its performance with respect to different anatomical structures. This section began with a discussion of the data-driven filter design approach guided by frequency domain behavior of the kernels. Quadratic energy interaction of all the sub-bands throughout the entire frequency spectrum led to synthesis of multiple kernels and the corresponding nonlinear images were reconstructed. Quadratic images were proven to be superior in quality compared to the original image in almost all aspects of imaging. Especially, the quadratic kernels 3 & 4 synthesized using nonlinear interaction of the high frequency sub-bands centered around 7.3 & 8.3 MHz respectively were observed to have the best overall performance.

The hyper-echoic wire targets were well resolved and distinctly visible in the quadratic images 3 & 4. The size of the wire targets were also observed to be closer to their actual dimension, 0.1 mm in diameter, compared to the original image. The anechoic cystic targets were observed to have less ultrasound clutter and reported considerable enhancement in negative CTR. The quadratic images also revealed true shape of both the contrast and the cystic targets, which were observed to be relatively circular than in the original image. Additionally, the specular reflection artifacts above and below the cystic targets were significantly suppressed. Another enhancement in the reconstructed quadratic images was formation of uniform and fully developed speckle with higher SNR in the tissue region. This provided for the demonstration of improved spatial (especially lateral) resolution and suppression of acoustic reverberation artifacts in the reconstructed quadratic dataset.

In-vivo Data

Imaging of a heterogeneous tumor with a highly perfused network of blood vessels in a Copenhagen rat was made possible by collecting in-vivo data before and after injection of UCA using a linear array probe HST15-8/20 with a center frequency of 10 MHz. The B-mode images acquired with and without UCA and their spectrogram are displayed in FIG. 17 with some of the important ROIs highlighted. The heterogeneous tumor is a hypoechoic, oval shaped structure extending from 3 mm to 7 mm axially and 2 mm to 17 mm laterally. Although most part of the tumor is necrotic (a part of it is shown as a green ellipsoid region) in nature, the highly perfused network of blood vessels located south-west of the tumor becomes undeniably visible post UCA injection which is marked as a red ellipse in the figure. The blue ellipse signifies the tissue region and the yellow line shows a microflow region, where the movement of a single bubble in an upward direction could be observed in M-mode data. One can also visualize a hypoechoic blood vessel located above the tissue region which extends laterally from right to left and acts as a feeder network for the tumor. The spectrogram shows the frequency content of the echo signal, which is broadband nature with a bandwidth ranging from 1.5 MHz to 10 MHz.

Quadratic Volterra Filter

The parameter values for deriving the kernels remain the same as the ones used for the QA phantom dataset. Grouping of the quadratic interaction bands and synthesis of the 2D Gaussian filters to capture specific frequency interactions were performed by analyzing bifrequency response of the individual kernels. Table V of FIG. 18 captures and groups all the singular modes used to synthesize the quadratic kernels at different energy bands.

Quadratic Imaging

The filters derived in the previous step were used to reconstruct quadratic images. The bifrequency response of the quadratic kernels at different energy bands, their one dimensional projected values and the reconstructed images are displayed in FIGS. 19 and 20 for the in-vivo dataset without and with UCA respectively. More particularly, the in-vivo dataset illustrated in FIGS. 19A-19C (before UCA injection) and 20A-20C (after UCA injection) show Gaussian filtered coherent quadratic kernels synthesized for three different nonlinear energy interaction bands and the corresponding QB-mode images displayed. The three columns display the different energy bands as defined in Table V (FIG. 18). The three rows display the bifrequency response of the quadratic kernels, their one dimensional projection computed along the frequency summation line, and QB-mode images respectively. It is interesting to notice that the kernels capturing quadratic interaction at different energy bands generate images with significantly different characteristics as shown in the figures. The following sections discuss the qualitative and quantitative enhancements of the reconstructed quadratic images highlighting some of the regions of interest.

Contrast Enhancement

Figure 17A:
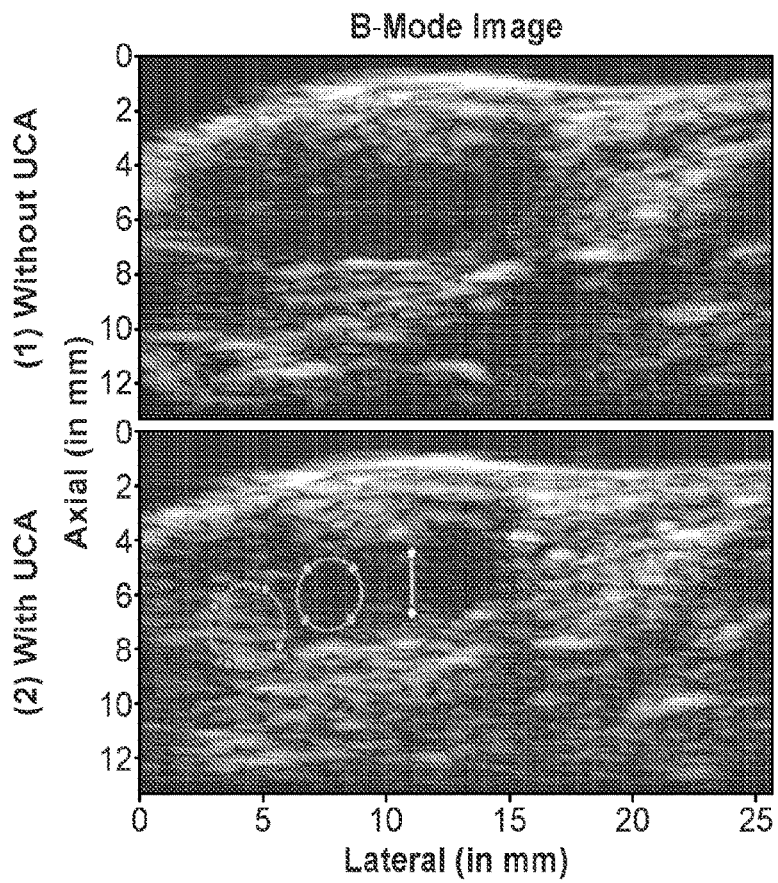
FIGS. 17A and 17B show imaging of a heterogeneous tumor in a rat by collecting in-vivo data before and after injection of ultrasound contrast agents (UCA) using a linear array probe with a center frequency of 10 MHz, the B-mode images of FIG. 17A acquired with and without UCA and their respective spectrograms are displayed in FIG. 17B.
Figure 17B:
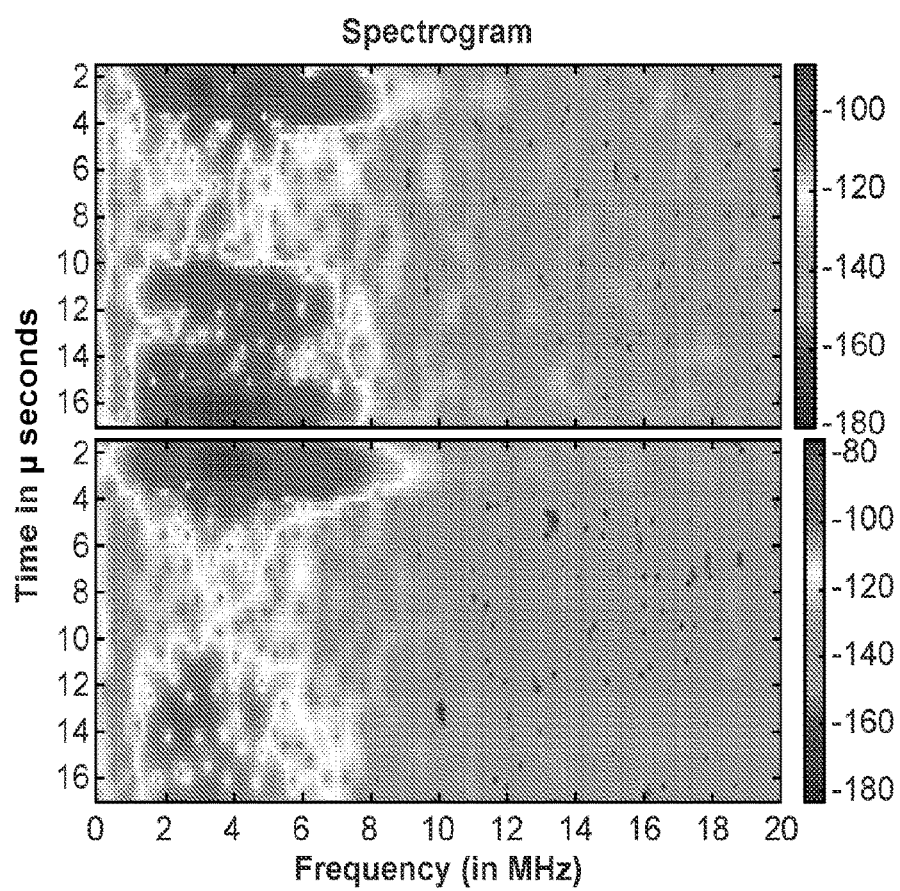
Figure 19C:
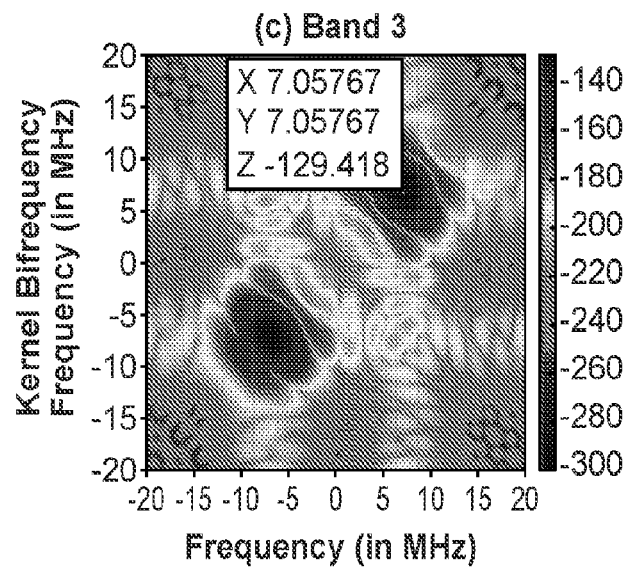
Figures 20A, 20B:
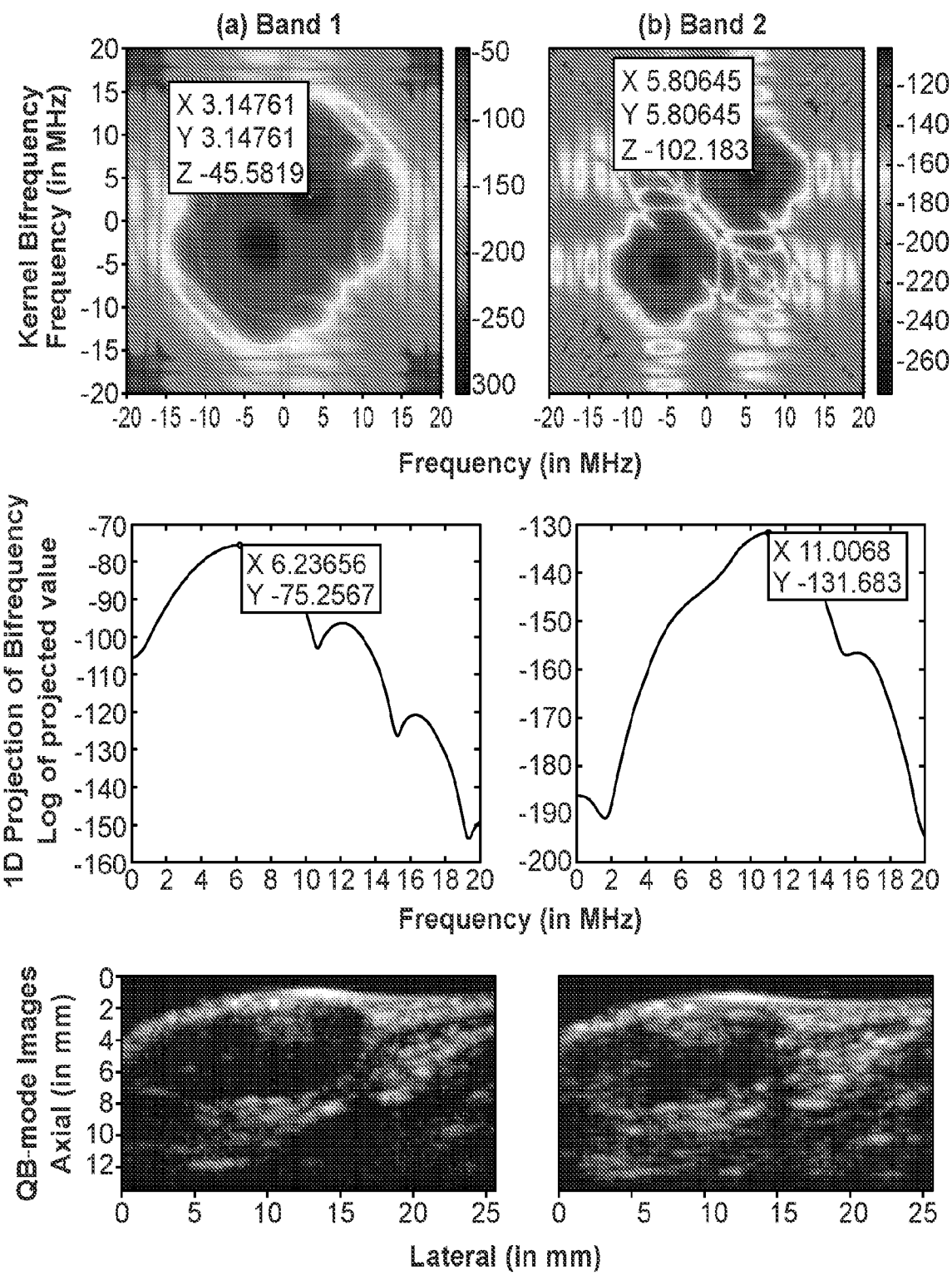
FIGS. 20A-20C illustrate an in-vivo dataset after UCA injection for the three different nonlinear energy interaction bands (Bands 1, 2, 3) as defined in Table V of FIG. 18, wherein the rows display the bifrequency response of the quadratic kernels, their one dimensional projection computed along the frequency summation line, and QB-mode images respectively.
Figure 20C:
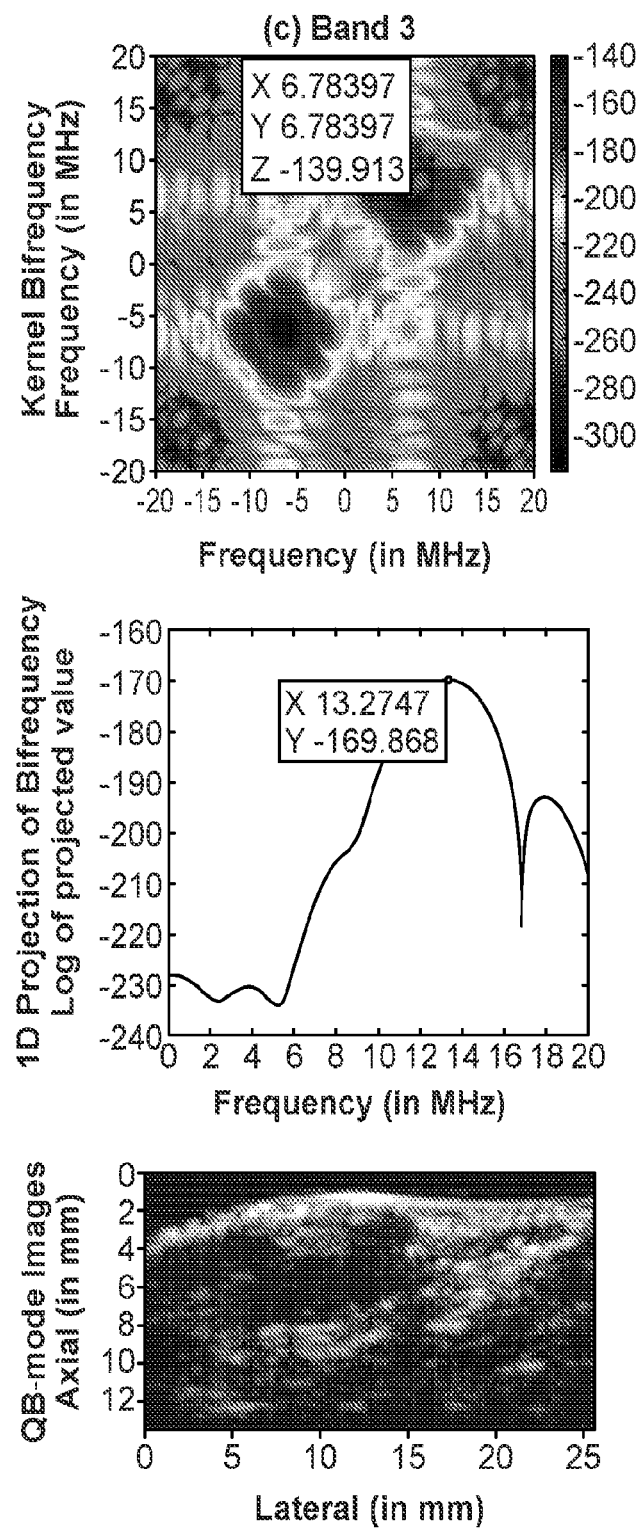
Figure 21:
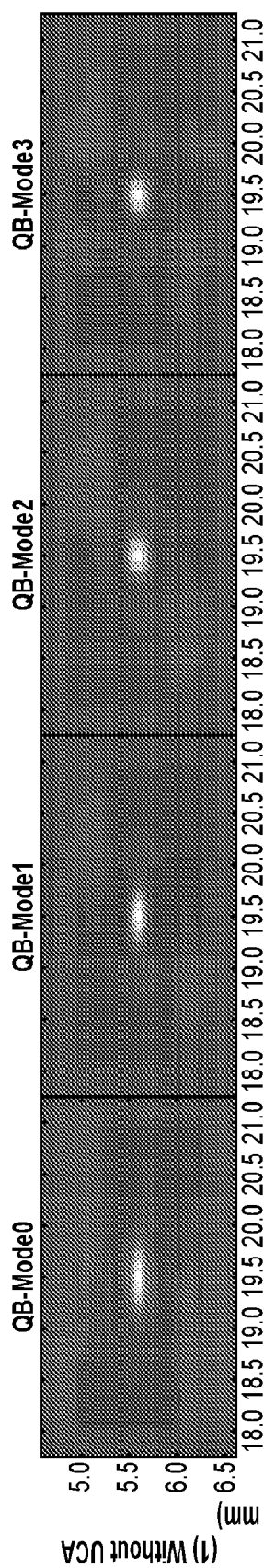
FIG. 21 illustrates an in-vivo dataset in the form of contrast enhancement data which signifies signal power computed in the necrotic region of the rat tumor, wherein it can be observed in Table VI that the quadratic signal power is significantly lower than the original B-mode dataset, which quantifies suppression of clutter artifacts in the tumor region.

Contrast enhancement is one of the desirable features of nonlinear filtering methods which improves the image specificity and hence increases diagnostic quality of the in-vivo data. The following text discusses the overall contrast enhancement of different regions of interest in quadratic images, beginning with the necrotic region of the heterogeneous tumor, which is hypoechoic in nature. Hypoechoic or anechoic regions, such as cysts and necrotic parts of tumors, are usually filled with acoustic clutter, which makes B-mode imaging method difficult to assess and characterize their condition and true boundaries. FIG. 17($a$) shows the B-mode image of the diagnosed region before injection of UCA and it can be observed that the top portion of the tumor is filled with ultrasound clutter. In FIGS. 19A-19C, there is shown three quadratic kernels synthesized at different frequency interactions, their one-dimensional projection, and the corresponding QB-mode images. It can be observed that the QB-mode images shown that FIGS. 19B and 19C are free of clutter artifacts which makes it easier to assess the actual size and nature of the tumor. Similar results are obtained for the images collected after UCA injection in FIGS. 20A-20C, where the necrotic region of the tumor is distinctly visible with significant clutter suppression. The first row of Table VI of FIG. 21 signifies signal power computed in the necrotic region of the tumor and it can be observed that the quadratic signal power is significantly lower than the original B-mode dataset, which quantifies suppression of clutter artifacts in the tumor region.

The injection of UCA provides for localization of the perfused network of blood vessels that surrounds the tumor by showing sporadic movement of microbubbles into and out of the imaging plane, which was clearly visible even in the B-mode images. It has been reported that microbubbles oscillate nonlinearly in an ultrasound field and the images reconstructed using the nonlinear echo components result in high specificity ultrasound images to capture UCA activity in perfused regions. FIG. 20 (B) shows a QB-mode image with a well defined perfused region with higher contrast activity. The second row of Table VI of FIG. 21 captures contrast enhancement which is computed by taking the difference between the signal power in the perfused region before and after UCA injection. It can be observed that the contrast enhancement post UCA injection in QB-mode data 1 & 2 are higher compared to the original. However the QB-mode data 3 has lower contrast enhancement compared to the original dataset. Another interesting observation to make in the QB-mode data 2 & 3 without UCA is presence of two bright dot like structures right on top of the perfused region, which could potentially be real static structure such as blood vessels. These are visible with higher clarity in the QB-mode images due to significant clutter suppression. Additionally, the contrast of the feeder blood vessels can be seen to have significantly improved in QB-mode data 2 & 3 for both with and without UCA.

Image Spatial Resolution

Figure 22:
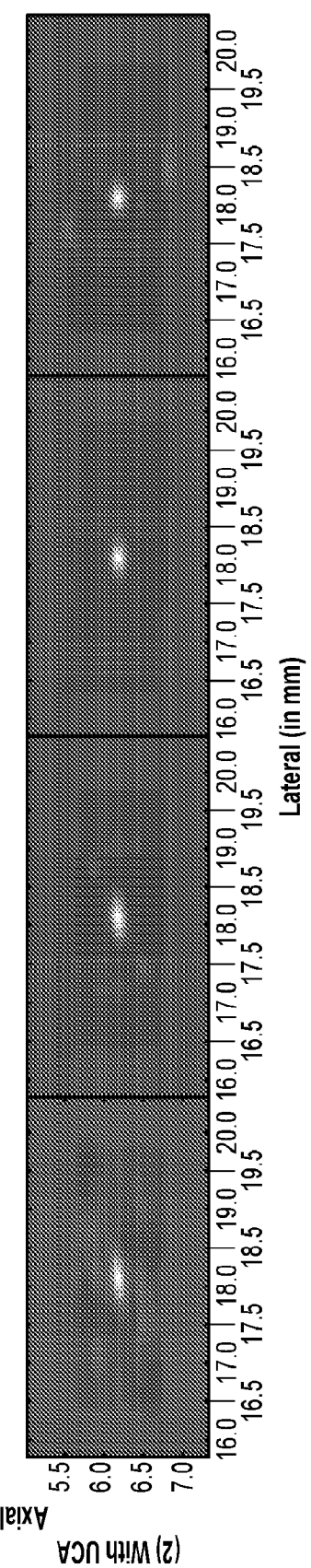
FIG. 22 illustrates an in-vivo dataset in the form of a covariance cell size analysis (with and without UCA) in which image resolution is quantified by computing 2D auto-covariance at a speckle-like tissue region and is shown in FIG. 22, which indicates improvement in lateral image resolution while preserving axial image resolution.

Previous work has demonstrated that higher harmonics have lower side lobes than the fundamental signal which leads to an improvement of lateral resolution in nonlinear ultrasound images. This phenomenon is easily observed in the QB-mode 2 & 3 images in both FIGS. 19 and 20, where lateral extent of any structure in the tissue region is much constrained than its counterpart in the B-mode. The image resolution is quantified by computing 2D auto-covariance at a speckle-like tissue region and is shown in FIG. 22, which indicates improvement in lateral image resolution while preserving it in the axial direction. The spatial resolution values were calculated following equation (19) and are listed in Table VII of FIG. 23 before and after UCA injection. It was observed that the quadratic data resulted in an improved lateral resolution compared to the original.

Reverberation Suppression

Figure 19C:
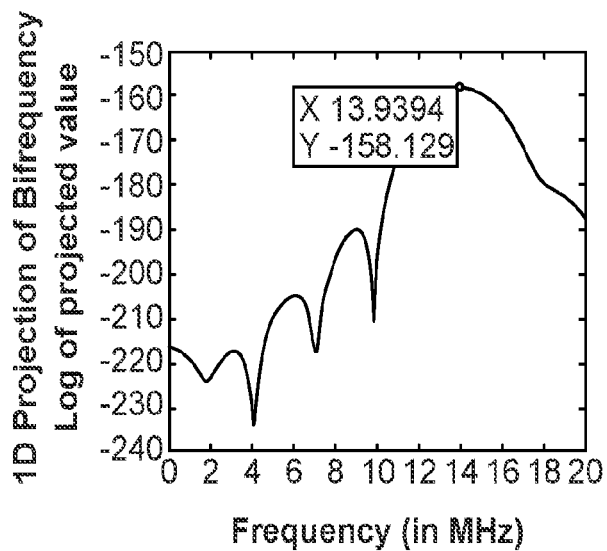
Figure 19C:
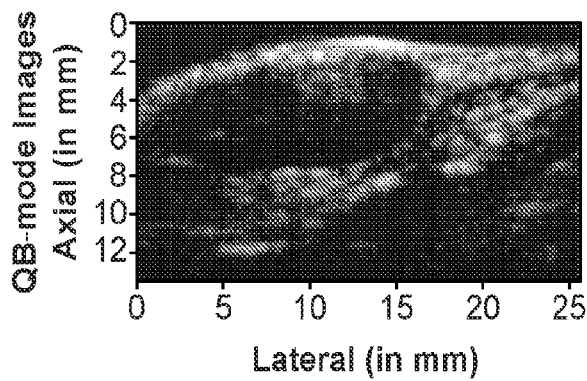

Reverberation is a well known ultrasound artifact which is easily observed below a structure with high reflectivity, where the returning echo signal gets reflected multiple times before it is finally received by the transducer. The imaging algorithm which uses the time-range equation, interprets the delayed arrival times of reverberated signals as multiple structures below the actual one. This phenomenon is observed by two parallel lines running below the skin, the brightest structure in the image, located at the top-center part of the original B-mode image as shown in FIG. 17(A). However, the strength of reverberated signals in the nonlinear echo component is very insignificant and hence QB-mode image results in cleaner data free of acoustic reverberation as shown in FIGS. 19 and 20. Although the skin region was chosen for an easy demonstration of reverberation free characteristics of nonlinear imaging, the concept can be generalized to the whole image.

Perfusion Characterization

Ultrasound Contrast Agents by nature exhibit sporadic movement contained inside blood vessels, which can be observed by running the image frames sequentially. Due to their noise-like behavior, the temporal statistics of microbubbles for single pixel coordinates reveals the perfusion characteristics, which is essentially the heart of TPI computation described earlier. The signal variance at a specific pixel over a finite number of frames in the temporal direction gives us the measure of UCA activity and hence the level of perfusion. At the same time, the whole term is normalized by the absolute pixel intensity in order to penalize the dominating structure with higher echogenicity and discount the variance introduced by noise. In the representative example, the following were used: $N_f$=20 number of frames, a 7×7 2D Gaussian low pass filter as spatial filter and a value of $\gamma$=0.7 to compute TPI for all the images.

Figure 24:
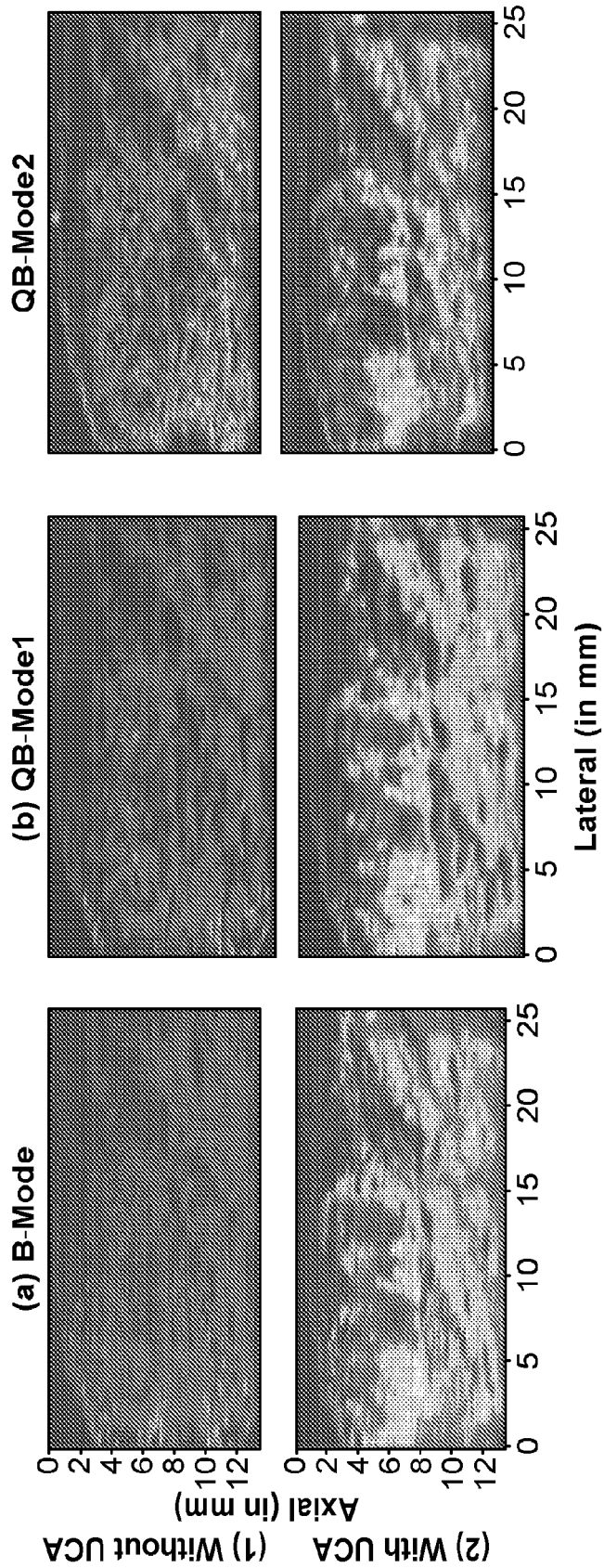
FIG. 24 Illustrates an in-vivo dataset showing a maximum intensity projection of temporal profusion index (TPI) values, wherein the maximum intensity projection of the TPI values for QB-mode is higher for the truly perfused regions, whereas the same for tumor and other static tissues are comparatively low, which indicates an improved specificity of the quadratic data in measuring heterogeneous perfusion in the in-vivo data.

The moving frames show microbubbles coming in and going out of the imaging plane signifying a highly perfused network of blood vessels located south-west of the tumor region. A couple of small micro vascular structures located in the tumor can also be seen to carry single bubble in the axial direction towards the transducer in the imaging plane. A feeder network in the north-east part of the imaging plane also shows mild perfusion activity in the original image. All of this information was captured by the TPI measurements and is represented in a compact manner by maximum intensity projection of TPI values as shown in FIG. 24. It can be observed that the maximum intensity projection of the TPI values for QB-mode is higher for the truly perfused regions as expected, whereas the same for tumor and other static tissues are comparatively low, which indicates an improved specificity of the quadratic data in measuring heterogeneous perfusion in the in-vivo data. The quadratic data also proves to be efficient in terms of rejecting variance due to noise and motion artifact due to breathing. The TPI data corroborates improved spatial resolution of the quadratic data by showing comparatively smaller microflow region carrying a single bubble upward.

Conclusion

Nonlinear imaging of a quality assurance phantom and an in-vivo tumor data surrounded by heterogeneous perfusion were performed using Polynomial Signal Processing techniques. Quadratic images were reported to be of superior quality than the original data in almost all aspects. Improved specificity due to increased tissue contrast, enhanced spatial resolution and ability to image true dimension of a structure in quadratic data makes it easier to successfully diagnose and assess condition of diseased body parts. Cleaner quadratic data reconstruction due to suppression of acoustic artifacts complements other quantitative ultrasound applications such as temperature estimation, speckle tracking, tissue characterization, flow measurement, etc. This approach also has a lot of potential in high energy applications that could modify the nonlinear scattering model of the targeted tissue.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A method for use in ultrasound imaging of matter in a region of interest, the method comprising:
    transmitting wave energy into the region of interest;
    transducing wave energy returned from the region of interest to form a set of receive signals defining received signal data;
    separating linear and nonlinear components of the received signal data based on a second order Volterra model, wherein separating the linear and nonlinear components of the received signal data based on the second order Volterra model comprises:
        synthesizing a plurality of quadratic filter kernels using individual singular modes;
        isolating specified bifrequency peaks in the bifrequency response of individual quadratic filter kernels using two-dimensional (2D) Gaussian filters centered at the specified peaks;
        grouping together quadratic filter kernels having bifrequency peaks in the same vicinity; and
        summing the quadratic filter kernels after adjusting for a time delay observed in a radio frequency (RF) domain.

2. The method according to claim 1, further comprising:
    computing an estimate of a tissue acoustic nonlinearity parameter, B/A, using a ratio of the nonlinear component to the linear component; and
    identifying tissue characteristics of the matter in the region of interest using the B/A parameter.

3. The method according to claim 1, comprising:
    separating linear and nonlinear components of the received signal data based on a third order Volterra model;
    computing an estimate of a tissue acoustic nonlinearity parameter, B/A, using a ratio of a quadratic component to the linear component;
    computing an estimate of a tissue acoustic nonlinearity parameter, C/A, using a ratio of a cubic component to the linear component; and
    identifying tissue characteristics of the matter in the region of interest using the B/A and C/A parameters.

4. The method according to claim 1, wherein the transmitted wave energy is synthesized with specific spectral components configured to create specific frequency interactions in the region of interest.

5. The method according to claim 1, wherein the region of interest is a myofascial pain syndrome (MPS) trigger point.

6. The method according to claim 1, comprising segregating the quadratic filter kernels into multiple groups based on nonlinear frequency interaction captured by the quadratic filter kernels after evaluating a bifrequency response of the quadratic filter kernels.

7. The method according to claim 2, wherein identifying the tissue characteristics of the matter in the region of interest comprises identifying tissue with high fat infiltration.

8. The method according to claim 2, comprising comparing the computed B/A parameter to B/A values established for different tissue characteristics.

9. An ultrasound transducer device, comprising:
    transmit circuitry coupled to an array of ultrasound transducers and configured to transmit wave energy into a region of interest;
    receive circuitry coupled to the array of ultrasound transducers and configured to transduce wave energy returned from the region of interest to form a set of receive signals defining received signal data;
    a second order Volterra filter configured to separate linear and nonlinear components of the received signal data based on a second order Volterra model; and
    a processor configured to:
        synthesize a plurality of quadratic filter kernels using individual singular modes;

isolate specified bifrequency peaks in the bifrequency response of individual quadratic filter kernels using two-dimensional (2D) Gaussian filters centered at the specified peaks;

group together quadratic filter kernels having bifrequency peaks in the same vicinity; and sum the quadratic filter kernels after adjusting for a time delay observed in a radio frequency (RF) domain.

10. The device according to claim 9, wherein the processor is configured to segregate the quadratic filter kernels into multiple groups based on nonlinear frequency interaction captured by the quadratic filter kernels after evaluating a bifrequency response of the quadratic filter kernels.

11. The device according to claim 9, wherein the processor is configured to:

separate linear and nonlinear components of the received signal data based on a third order Volterra model;

compute an estimate of a tissue acoustic nonlinearity parameter, B/A, using a ratio of a quadratic component to the linear component;

compute an estimate of a tissue acoustic nonlinearity parameter, C/A, using a ratio of a cubic component to the linear component; and identify tissue characteristics of the matter in the region of interest using the B/A and C/A parameters.

12. The device according to claim 9, wherein the transmitted wave energy is synthesized with specific spectral components configured to create specific frequency interactions in the region of interest.

13. The device according to claim 9, wherein the region of interest is a myofascial pain syndrome (MPS) trigger point.

14. The device according to claim 9, wherein the processor is configured to:

compute an estimate of a tissue acoustic nonlinearity parameter, B/A, using a ratio of the nonlinear component to the linear component; and identify tissue characteristics of the matter in the region of interest using the B/A parameter.

15. The device according to claim 14, wherein the processor is configured to identify tissue with high fat infiltration.

16. The device according to claims 14, wherein the processor is configured to compare the computed B/A parameter to B/A values established for different tissue characteristics.

* * * * *